United States Patent [19]
Nabeta et al.

[11] Patent Number: 6,026,154
[45] Date of Patent: *Feb. 15, 2000

[54] INTEROFFICE MULTIPARTY CONNECTION METHOD AND EXCHANGE

[75] Inventors: Masashi Nabeta; Takuma Okuno, both of Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/615,630

[22] Filed: Mar. 13, 1996

[30] Foreign Application Priority Data

May 31, 1995 [JP] Japan ..................................... 7-133102

[51] Int. Cl.$^7$ .......................... H04M 11/00; H04M 1/00; H04M 3/00
[52] U.S. Cl. ...................... 379/202; 379/93.21; 379/158; 379/224; 379/258
[58] Field of Search .................................. 379/67, 88, 89, 379/202, 211, 93.07, 93.21, 100.15, 156, 158, 201, 219, 224, 227, 258

[56] References Cited

U.S. PATENT DOCUMENTS 4,456,792  6/1984  Courtney-Pratt ........................... 379/67
5,117,451  5/1992  Ladd et al. ................................. 379/67
5,138,614  8/1992  Baumgartner et al. .................... 370/62

Primary Examiner—Fan S. Tsang
Assistant Examiner—Allan Hoosain
Attorney, Agent, or Firm—Helfgott & Karas, P.C.

[57] ABSTRACT

The present invention is directed to acquire a multiparty connection trunk at an office where a communication line can be used effectively when a user while communication requests the multiparty connection over different offices. In order to achieve the above mentioned object, in the present invention, an first exchange that receives a multiparty connection request designating a terminal of a third party located at a different office from a first terminal, communicating with a second terminal located at the different office or other, the first exchange generates a call setup message including, a channel number used for the communication already established, and a call reference that is different from the call reference used for the communication, and sends it to a downstream office. An second exchange receiving the call setup message determines whether or not the second terminal and/or the third party terminal is located at a office where the second exchange is located. If the called second terminal and/or the third party terminal is located at the office, the second exchange acquires a multiparty connection trunk for the multiparty connection.

19 Claims, 21 Drawing Sheets

| PHONE NUMBER OF TERMINAL NO. 1 |
|---|
| LINE TYPE FOR TERMINAL NO. 1 |
| PHONE NUMBER OF TERMINAL NO. 2 |
| LINE TYPE FOR TERMINAL NO. 2 |
| ⋮ |

FIG. 3

| PHONE NUMBER OF TERMINAL NO. 1 |
|---|
| ROUTE NUMBER OF TERMINAL NO. 1 |
| ⋮ |

FIG. 4

| CHANNEL NUMBER |
| --- |
| OCCUPIED OR UNOCCUPIED |
| PHONE NUMBER OF CALLING TERMINAL<br>PHONE NUMBER OF CALLED TERMINAL |
| •<br>•<br>• |

FIG. 5

| TRUNK NUMBER |
|---|
| CHANNEL NUMBER OF OCCUPIED CHANNEL |
| CALL REFERENCE OF COMMUNICATING PARTY |
| CALL REFERENCE OF THIRD PARTY |
| ROUTE NUMBER OF COMMUNICATING PARTY |
| ROUTE NUMBER OF THIRD PARTY |

FIG. 6(A)

| TRUNK NUMBER |
|---|
| CHANNEL NUMBER OF OCCUPIED CHANNEL |
| CALL REFERENCE |
| REQUESTING TERMINAL NUMBER |

FIG. 6(B)

| TRUNK NUMBER |
|---|
| CHANNEL NUMBER OF OCCUPIED CHANNEL |
| CALL REFERENCE |
| REQUESTING TERMINAL NUMBER |

FIG. 6(C)

CONNECTION PATTERN 1

CONNECTION PATTERN 2

CONNECTION PATTERN 3

CONNECTION PATTERN 4

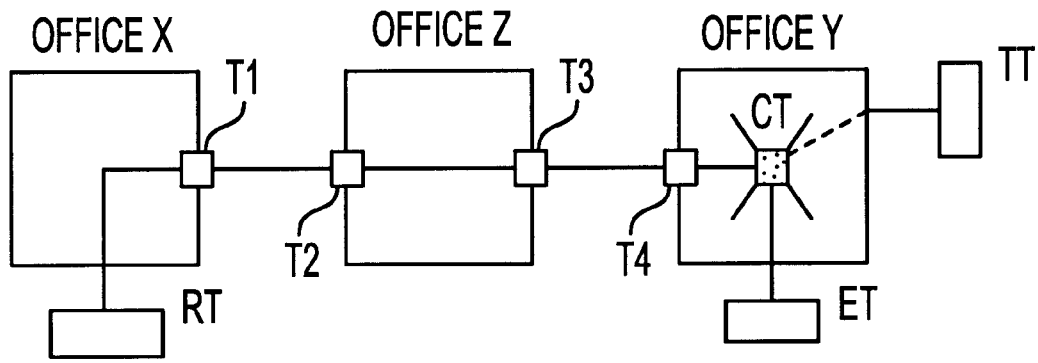
CT AT OFFICE Y CANNOT ACQUIRED
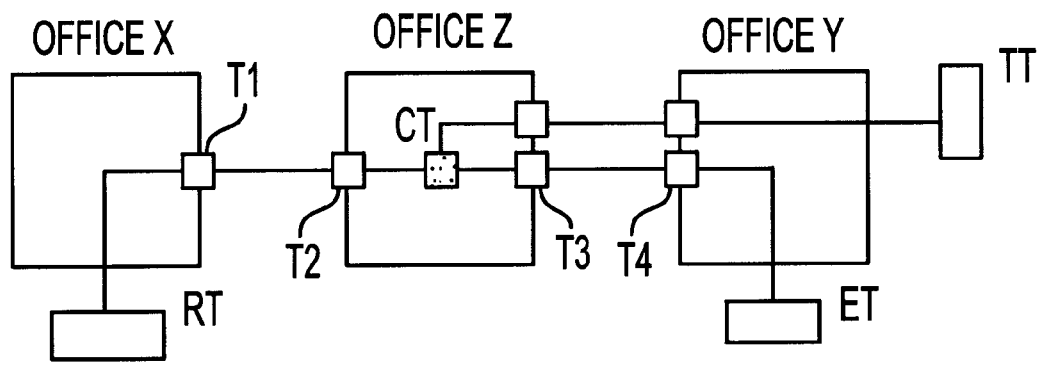
FIG. 9

INTEROFFICE MULTIPARTY CONNECTION METHOD AND EXCHANGE

BACKGROUND OF THE INVENTION

1. Industrial Application Field

The present invention relates to an interoffice multiparty connection method and an exchange implementing the interoffice multiparty connection method.

2. Prior Art

Advanced exchange service in the recent information network is required to be provided at different offices as well as at a local office. It is thus important to utilize all resources on the network for the effective and positive realization of the service. Multiparty connection service is an example of such service and is required to be provided among offices in a simple manner without deteriorating performance of an exchange.

The multiparty connection service is typically used to establish intercommunication (teleconference communication) among three or more parties. More specifically, when communication has been established between two terminals at the same office, an exchange of the office calls a third terminal at the same office in response to a request from either terminal to establish the intercommunication among these terminals. In other words, this multiparty connection service is provided by means of calling a terminal at an office in response to a request from either one of the terminals at the same office between which communication has been established and connecting lines for these three terminals to a multiparty connection trunk. In the multiparty connection service, a multiparty connection request may be made by designating two or more terminals at an office during calling from a terminal at the same office to establish intercommunication among the designated terminals and the calling party terminal.

The terminals to be serviced are not necessarily at one office. Instead, two or more terminals at a different office or offices may be subject to the multiparty connection service.

For example, it is assumed that communication has been established between a first terminal at a first office and a second terminal at a second office through a third office. When a user who uses the first terminal requires to establish multiparty connection among a third terminal at the second office, the second terminal, and the first terminal, this user transmits either hooking signal or a certain dialing signal (DTMF signal) from the first terminal to an exchange at the first office. This dialing signal (DTMF signal) includes a dialing signal indicative of a request for the multiparty connection service and a dialing signal indicative of a phone number of the third terminal. As a result of the transmission of the hooking signal or the DTMF signal, the exchange at the first office recognizes that the multiparty connection service is required. And the exchange at the first office acquires a conference trunk (multiparty connection trunk). Next, the exchange at the first office acquires a line between the first office and the third office. And the exchange at the first office supplies a connection control signal to the third office. This connection control signal designates to acquire a line between the third office and the second office.

In response to the connection control signal supplied from the first office, a exchange at the third office acquires a line between the third office and the second office, and supplies a connection control signal to the second office. This connection control signal designates to connect the acquired line to the third terminal.

A exchange at the second office calls the third terminal in response to the reception of the connection control signal supplied from the third office. The exchange at the second office connects the line acquired between the third office and the second office to the third terminal when the latter responds to the call.

Upon completion of the above mentioned process, the exchange at the first office connects the line connected with the first terminal to the conference trunk. And the exchange at the first office connects the line connected with the second terminal to the conference trunk. Further, the exchange at the first office connects a line connected with the third terminal to the conference trunk.

The conference trunk adds voice signals transmitted from the first terminal, the second terminal and the third terminal, and outputs the addition result to each terminal.

In the above mentioned conventional system, the multiparty connection trunk (conference trunk) at the first office is acquired and connected to the first terminal, the second terminal, and the third terminal. In this case, two lines between the first office and the second office are occupied until the communication (conference) is finished among the users between the first and third offices as well as between the third and second offices. Transmission lines for the transit can not be used effectively.

If all multiparty connection trunks at the first office are occupied, the first terminal cannot acquire any multiparty connection trunk. Accordingly, no multiparty connection is established in such a case. In order to overcome this problem, a multiparty connection trunk at a different office may be acquired by the first terminal. This method, however, requires the user at the first terminal complicated and bothersome operations. This is also true in an exchange on a network that supports an ISDN protocol when the multiparty connection is tried to be established over different offices.

Accordingly, an object of the present invention is to acquire a multiparty connection trunk automatically for the establishment of multiparty connection at an office where a communication line can be used effectively when a user while communication requests the multiparty connection over different offices on a network comprising of exchangers each of which supports an ISDN protocol.

Another object of the present invention is to acquire, when a multiparty connection trunk cannot be acquired at an office, the multiparty connection trunk at a different office. 1

Yet another object of the present invention is to attain above objects easily without affecting performance of the exchange.

SUMMARY OF THE INVENTION

In the present invention, when a multiparty connection request is issued from a first terminal at a first office communicating with a second terminal at a second office to establish multiparty connection with a third party at the second office or at another office on the local route as the second office, a call setup message is generated for the multiparty connection by a first exchange at the first office where the requesting party terminal is located. This call setup message includes a channel number of a channel occupied for the communication between the second terminal at the second office and the requesting party terminal, a new call reference that is different from the call reference used for the subject communication, and information for use in identifying a terminal of a third party. This call setup message is transmitted on the local route towards the second office.

In response to the call setup message, a second exchange at a office on the route determines whether the channel specified by the channel number included in this call setup message is occupied or not. If the channel is occupied, the second exchange compares the call reference corresponding to the occupied channel with the call reference included in the call setup message. If these two call references do not match with each other, the call setup message is determined as a message for the multiparty connection.

Determining that the received call setup message is the message for the multiparty connection, the second exchange reads the information for use in identifying the terminal of the third party out of the call setup message. The second exchange then determines whether this terminal of the third party is a terminal located at the local office as the second exchange. In this event, the second exchange acquires a multiparty connection trunk when it finds the terminal of the third party is the one located at the local office. The second exchange connects the communication call established between the first terminal and the second terminal to the multiparty connection trunk. The second exchange calls the terminal of the third party and connects it to the multiparty connection trunk. As a result, the multiparty connection is established among the first terminal, the second terminal, and the terminal of the third party.

The second exchange also acquires the multiparty connection trunk when it finds the terminal of the third party is not the one located at the local office. The second exchange connects the communication call between the first terminal and the second terminal to the multiparty connection trunk. Furthermore, the second exchange supplies the call setup message addressed to the terminal of the third party to a third exchange at a downstream office.

When the terminal of the third party responds, the third exchange at the subsequent office supplies to the second exchange a message indicating the third party responds.

The second exchange receiving the message indicative of the response of the third party connects a call of the terminal of the third party to the multiparty connection trunk. As a result, the multiparty connection is established among the requesting party terminal, the communicating party terminal, and the terminal of the third party.

At a transit office between the first terminal and the second terminal, a exchange receiving the call setup message reads the information identifying the third party terminal out of the call setup message to determine whether the third party terminal is located at the local office. If the third party terminal is located at the local office, the exchange acquires the multiparty connection trunk. The exchange then connects the call between the first terminal and the second terminal to the multiparty connection trunk. Next, the exchange calls the third party terminal and connects it to the multiparty connection terminal.

When determining that the third party terminal is not located at the local office, the exchange at the transit office determines whether the third terminal is on the local route as the second terminal. If the third party terminal is on the different route from the second terminal, the exchange acquires the multiparty connection trunk to connect the calls of the first terminal and the second terminal to the multiparty connection trunk. Next, the exchange sends a call setup message to the route of the office where the third party terminal is located. When the third party terminal responds, the exchange connects the call of the third party terminal to the multiparty connection trunk.

If the exchange fails to acquire the multiparty connection trunk, it generates a message requesting for acting of the multiparty connection. The exchange then sends this message to the exchange at an upstream office.

If a request is issued from a terminal in the multiparty connection for a multiparty connection of a fourth or more terminal(s), a exchange at an office where the requesting party terminal is located sends a call setup message as mentioned above.

An exchange which received the call setup message determines that a channel specified by a channel number in this message is occupied and that the there are two or more call references occupied that correspond to the subject channel number. The exchange thus recognizes that the subject request is for the multiparty connection with the fourth or more terminal(s). The exchange determines whether the multiparty connection already established is excuted by a multiparty connection trunk in the local office or by a multiparty conncetion trunk in other office. When determining that the multiparty connection already established is excuted by the multiparty connection trunk in the local office, the exchange connects the fourth or more terminal(s) which is(are) destination terminal(s) of the call setup message to the multiparty connection trunk. The multiparty connection among four terminals or more terminals is thus established.

On the other hand, the exchange determines whether the multiparty connection trunk in the local office is available when it determines that the multiparty connection already established is excuted by a multiparty connection trunk in other local office. If the multiparty connection trunk in the local office is available for the acquisition, the exchange then acquires the multiparty connection trunk in the local office to connect the call of the multiparty connection already established and the forth terminal or more terminal(s) which is(are) destination terminal(s) of the call setup message to the multiparty connection trunk. And, if the exchange fails to acquire the multiparty connection trunk, it requests the exchange at the upstream office for the acting of the multiparty connection. Moreover, if the multiparty connection trunk in the local office is not available, then the exchange requests the exchange at the downstream office for the acquisition of the multiparty connection trunk.

Next, an exchange of the present invention is described.

The exchange of the present invention comprises request transmitting portion and request receiving portion.

The request transmitting portion comprises multiparty connection request analysis means, message generation means, and message transmission means.

The multiparty connection request analysis means, when it receives a multiparty connection request signal including a telephone number of a third party terminal from a first terminal in communication with a second terminal at a different office, determines whether the third party terminal is located at a office on a route as the office where the second terminal is located.

The message generation means generates a call setup message including a channel number which specified a channel used for the communication between the first terminal and the second terminal, a new call reference which is different from a call reference used for the communication between the first terminal and the second terminal, and information for use in identifying the third party terminal, when it is determined that the third party terminal is located at the office on the local route as the second terminal.

The message transmission means sends the call setup message generated by the message generation means towards the route through a control channel.

Further, the request receiving portion comprises message analysis means, attribute determination means, and multiparty connection means.

The message analysis means, when it receives a call setup message from a upstream office, determines whether the call setup message is a message for the multiparty connection request. In other words, it is determined that the call setup message is the one for the multiparty connection request in case that a channel specified by a channel number in the call setup message is occupied and a call reference corresponding to the occupied channel is different from a call reference in the call setup message.

The attribute determination means determines whether a second terminal is located at the local office and whether a third party terminal is located at the local office.

The multiparty connection means acquires the multiparty connection trunk at the local office when the second terminal and the third party terminal are both located at the local office to connect a first terminal, the second terminal, and the third party terminal to the multiparty connection trunk.

The exchange may have acting request means to supply a message to an upstream office, requesting the acting of the multiparty connection when it fails to acquire the multiparty connection trunk. Multiparty connection acting processing means may be provided that acts the multiparty connection.

Furthermore, the exchange may have message relay processing means that transmits the call setup message as such to a downstream office when the attribute determination means determines that the second terminal and the third party terminal are not located at the local office and when the second terminal and the third party terminal are located at the office on the local route.

As mentioned above, according to the present invention, the multiparty connection trunk is acquired at the office where the communication line can be used effectively. Even if no multiparty connection trunk can be acquired at one office, the multiparty connection trunk may be acquired at a different office by means of exchanging a message between or among offices. These functions can be achieved easily without affecting the performance of the exchange system. In addition, these functions can be achieved without significant change, modification, or alternation of specifications and/or structure of the exchange(s).

BRIEF DESCRIPTION OF THE DRAWING

FIG. 3 is a view illustrating a specific example of a number plan table;

FIG. 4 is a view illustrating a specific example of a route number table;

FIG. 5 is a view illustrating a specific example of a channel state table;

FIG. 6 is a view illustrating a specific example of a management data table;

FIG. 9 is a block diagram for use in describing a multiparty connection acting processing;

DETAILED DESCRIPTION OF THE PREFERRED EMBODIMENTS

A conventional multiparty connection is described first for the purpose of facilitating the understanding of the present invention.

Figure 1A:
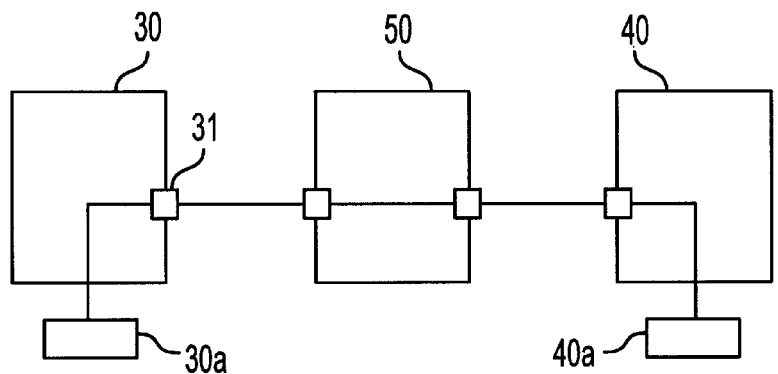
FIG. 1 is a block diagram for use in describing a conventional method of multiparty connection.
Figure 1B:
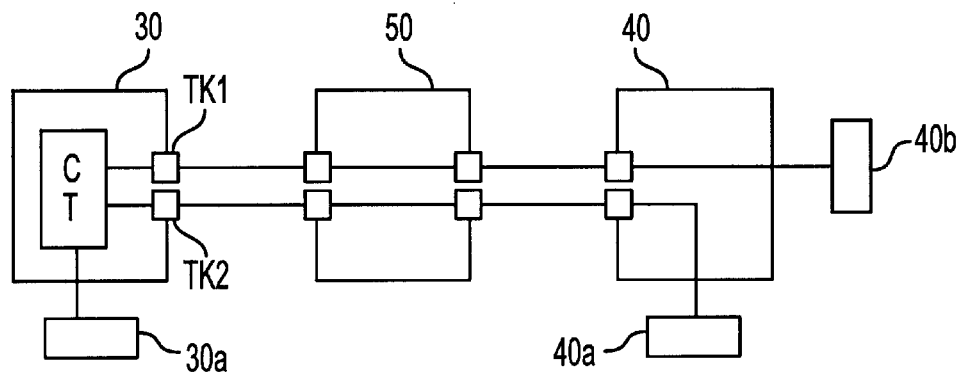
Figure 1C:
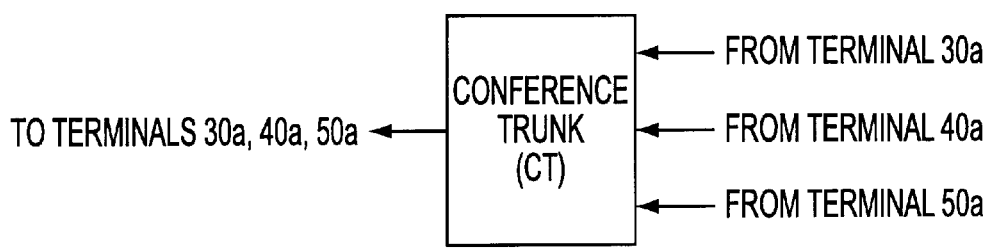

Referring to FIG. 1(A), communication has been established between a first terminal 30a of at a first office 30 and a second terminal 40a at a second office 40 through a third office 50. When a user who uses the first terminal 30a at the first office 30 requires to establish multiparty connection among the first terminal 30a, the second terminal 40a and a third terminal 40b at the second office 40, this user transmits either hooking signal or a certain dialing signal (DTMF signal) to an exchange 31 at the first office 30. This dialing signal (DTMF signal) includes a dialing signal indicative of a request for the multiparty connection service and a dialing signal indicative of a phone number of the third terminal 40b. As a result of the transmission the hooking signal or the the DTMF signal, the exchange 31 at the first office 30 recognizes that the multiparty connection service is required and acquires a conference trunk (multiparty connection trunk) CT. Next, the exchange 31 at the first office 30 acquires line between the first office and the third office. And the exchange 31 at the first office 30 supplies a connection control signal to the third office 50. This connection control signal designates to acquire a line between the third office 50 and the second office 40. In response to the connection control signal supplied from the first office 30, an exchange at the third office 50 acquires a line between the third office 50 and the second office 40, and supplies a connection control signal to the second office 40. This connection control signal designates to connect the acquired line to the third terminal 40*b*.

An exchange at the second office 40 calls the third terminal 40*b* in response to the reception of the connection control signal supplied from the exchange at the third office 50. The exchange at the second office 40 connects the line acquired between the third office 50 and the second office 40 to the third terminal 40*b* when the latter responds to the call.

Upon completion of the above mentioned process, the exchange 31 at the first office 30 connects a line connected with the first terminal 30*a* to the conference trunk CT. And the exchange 31 at the first office 30 connects a line connected with the second terminal 40*a* to the conference trunk CT. Further the exchange 31 at the first office 30 connects a line connected with the third terminal 40*b* to the conference trunk CT. The conference trunk CT adds voice signals transmitted from the first terminal 30*a*, the second terminal 40*b* and the third terminal 40*b*, and supplies the addition result to each terminal.

In the above mentioned conventional system, two lines between the first office 30 and the second office 40 are occupied until the communication (conference) is finished among the users between the first and third office as well as between the third and second offices. Transmission lines for transit can not be used effectively. Further, if all multiparty connection trunks (CT) at the first office 30 are occupied, the first terminal 30*a* can not acquire any multiparty connection trunk. Accordingly, no multiparty connection is established in such a case. In order to overcome this problem, a multiparty connection trunk (CT) at a different office may be acquired by the first terminal 30*a*. This method, however, requires the user who uses the first terminal 30*a* complicated and bothersome operations. This is also true in an exchange on a network that supports an ISDN protocol when the multiparty connection is tried to be established over different offices.

Next, an embodiment of the present invention is described.

Figure 2:
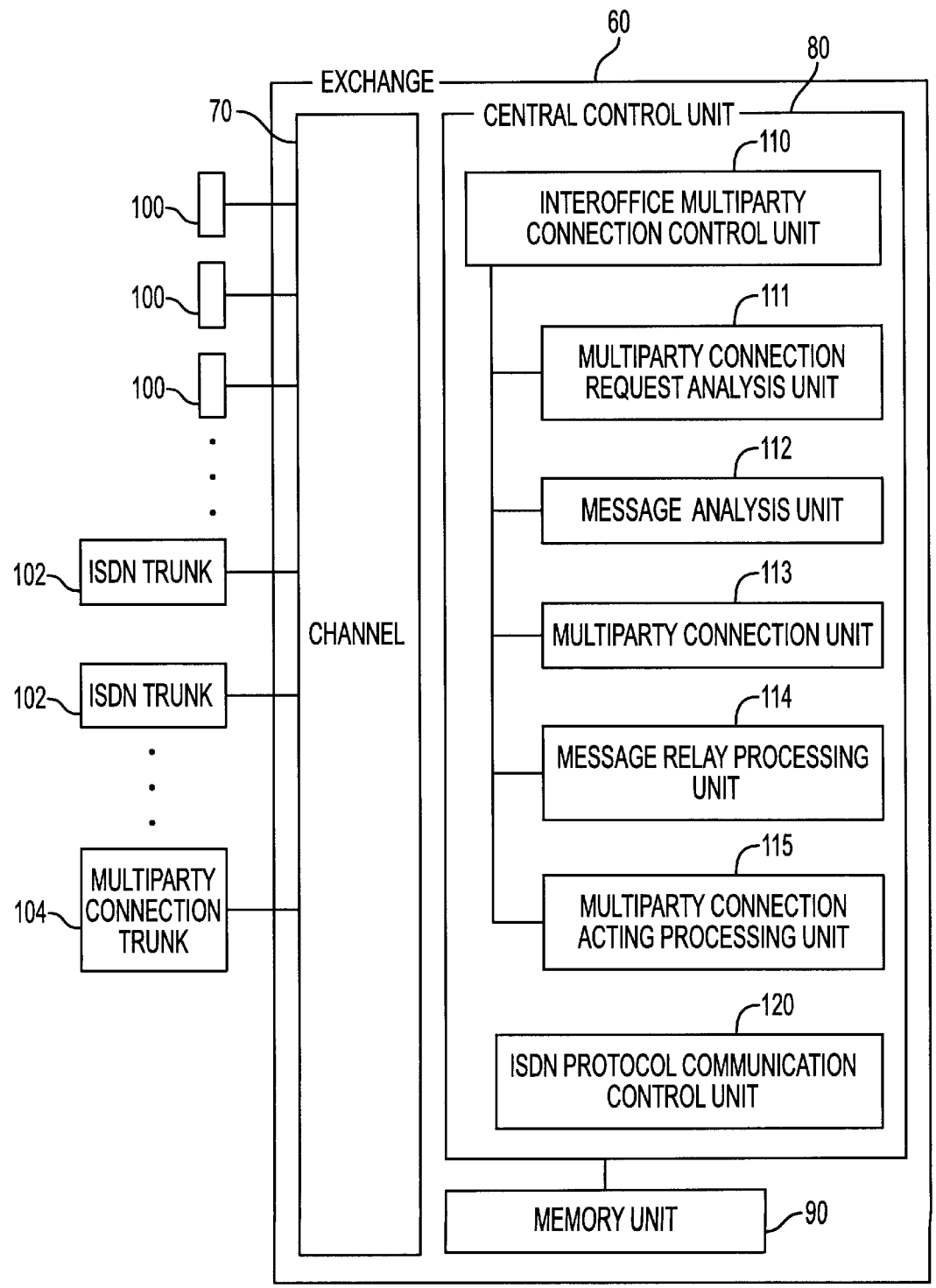
FIG. 2 is a block diagram illustrating a fundamental structure of an exchange forming a network according to the present invention.

FIG. 2 is a block diagram illustrating a fundamental structure of an exchange forming a network. An exchange 60 supports an ISDN protocol and comprises a channel 70, a central control unit 80, and a memory unit 90. The channel 70 is connected to a number of terminals 100 through subscriber trunks (not shown). The channel 70 is also connected to a number of ISDN trunks 102, and a number of multiparty connection trunks 104. Each ISDN trunk 102 is connected to a transmission line one end of which is connected in turn to a different office. The channel 70 switches connection and disconnection between the terminals 100, between the terminal 100 and the ISDN trunk 102, between the ISDN trunks 102, between the terminal 100 and the multiparty connection trunk 104, and the ISDN trunk 102 and the multiparty connection trunk 104.

The multiparty connection trunk 104 mixes plural voice signals which are transmitted from terminals and/or the ISDN trunks 102 and tranismits the mixed signal to the terminals and or the ISDN trunks 102, when the multiparty connection trunk 104 is connected to lines for a number of terminals and/or the ISDN trunks 102.

The memory unit 90 stores various data including a data of the terminals and the trunks and state data for facilities used for controlling the switching, control information, a channel state table, a number plan table, a route number table, a management data table, and other programs carried out by the central control unit 11. The number plan table is for use in registering, for each phone number of the terminals on the network, a type or types of the line available for the subject terminals as, shown in FIG. 3. The route number table is for use in registering, for each phone number of the terminals on the network, a route number of the office at which the subject terminals is located, as shown in FIG. 4. The channel state table is for use in registering, for each channel number of the channel, information to determine whether a certain channel is in an occupied state and, if the channel is occupied, the phone numbers of a calling party terminal and a called party terminal occupying the channel, as shown in FIG. 5. The management data table registers, for each trunk number of subscriber trunks, data related to the terminal(s) connected to the subscriber trunk(s), as shown in FIG. 6. More specifically, FIG. 6(A) shows an example of management data in the subscriber trunk to which a requesting party terminal that has issued an interoffice multiparty connection request is connected. This data consists of a channel number of the occupied communication channel, the call reference used for the communication with a communicating user, the call reference used for the communication with the terminal of a third party, a route number of the communicating user, and the route number of the third party. FIG. 6(B) shows an example of management data in the subscriber trunk to which a communicating party terminal is connected. This data consists of a channel number of the occupied communication channel, the call reference assigned to the communicating party terminal, and the phone number of the requesting party terminal. FIG. 6(C) shows an example of management data in the subscriber trunk to which a terminal of the third party is connected. This data consists of a channel number of the occupied communication channel, the call reference assigned to the terminal of the third party, and the phone number of the requesting party terminal.

The central control unit 80 executes the program(s) stored in the memory unit 90 for the switching processing. The function achieved as a result of the execution of the program (s) stored in the memory unit 90 can be classified into two sections as shown in FIG. 2: an interoffice multiparty connection control unit 110 and an ISDN protocol communication control unit 120. The ISDN protocol communication control unit 120 carries out a communication control with an ISDN protocol. On the other hand, the interoffice multiparty connection control unit 110 carries out processing associated with the multiparty connection. The interoffice multiparty connection control unit 110 has different functions achieved by a multiparty connection request analysis unit 111, a message analysis unit 112, a multiparty connection unit 113, a message relay processing unit 114, and a multiparty connection acting processing unit 115. The multiparty connection request analysis unit 111 is a component serving as multiparty connection request analysis means, message generation means, message transmission means, and attribute determination means. The multiparty connection request analysis unit 111 analyzes a multiparty connection request from the terminal 100 in the local office while communicating with a terminal in a different office (hereinafter, referred to as a communicating party terminal) and generates a call setup message for the multiparty connection. The multiparty connection request analysis unit 111 then supplies the generated call setup message to the subject different office.

Figure 7:
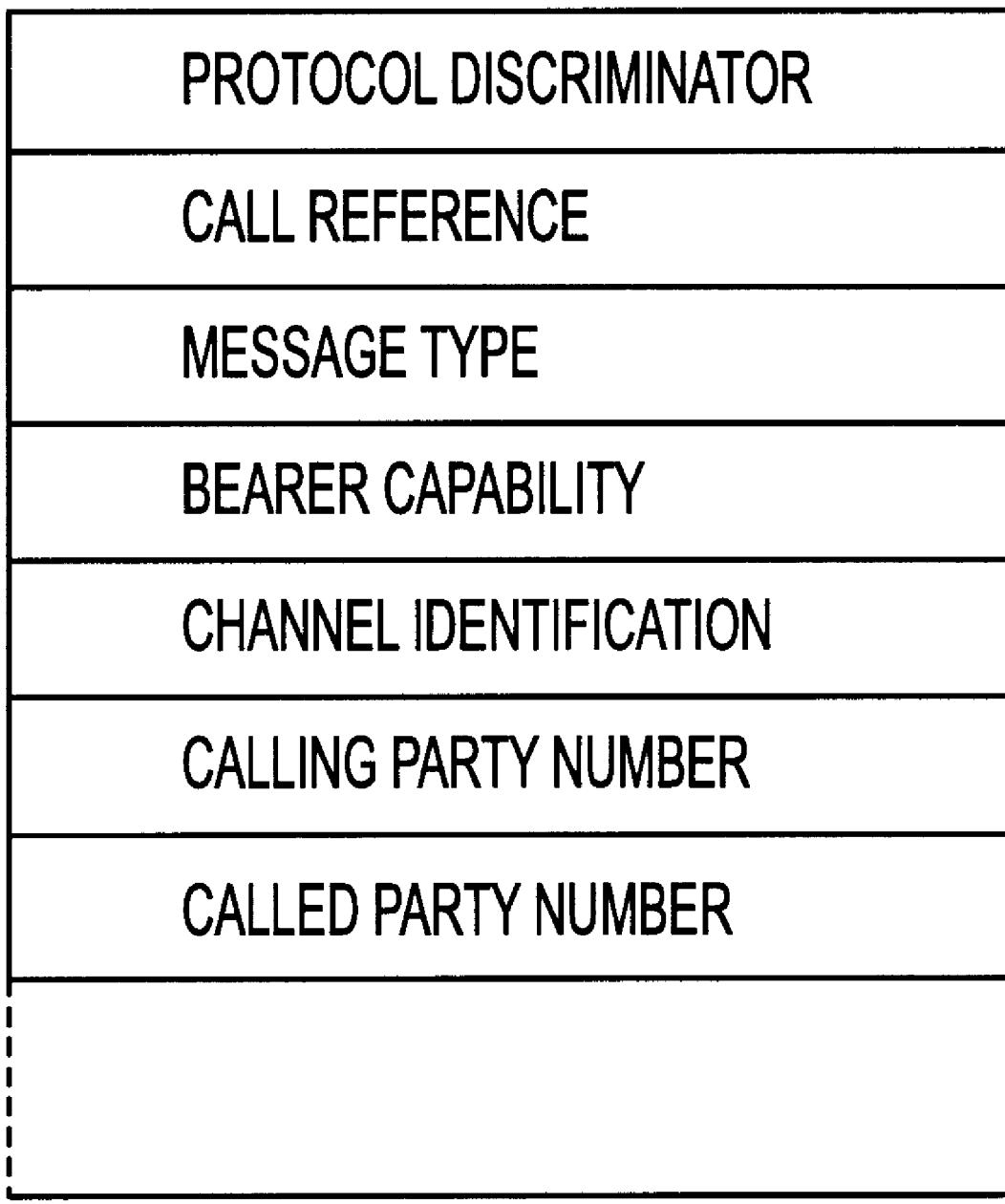
FIG. 7 is a view for use in describing a structure of a call setup message.

The call setup message comprises, as shown in FIG. 7, information such as a protocol discriminator, a call reference, a message type, a bearer capability, a channel identification, a phone number of a calling party terminal, and a phone number of a called party terminal. The call setup message for the multiparty connection has a channel identification that is local as the channel occupied for the communication with the communicating party terminal and a call reference that is different from the call reference used for the subject communication.

When receiving the call setup message for the multiparty connection from an exchange at a different office, the multiparty connection request analysis unit 111 determines whether the communicating party terminal is located at the local office and whether the terminal of the third party is located at the local office. The message analysis unit 112 is a component serving as message analysis means according to the present invention. The message analysis unit 112 analyzes a message in the ISDN protocol supplied from a different office and determines whether the received message is the call setup message for the multiparty connection. The multiparty connection unit 113 acquires the multiparty connection trunk and connects the terminal requesting the multiparty connection and the call from the communicating party terminal to the multiparty connection trunk 104. The message relay processing unit 114 relays the received call setup message for the multiparty connection to a different office. The multiparty connection acting processing unit 115 is a component serving as acting request means and multiparty connection acting processing means according to the present invention. The multiparty connection acting processing unit 115 requests an exchange at an upstream office to act the multiparty connection processing when the multiparty connection unit 113 fails to acquire the multiparty connection trunk 104. In addition, the multiparty connection acting processing unit 115 acquires the multiparty connection trunk 104 and connects thereto an associated call when it receives the multiparty connection acting request from a downstream office.

In the network formed of the exchange 60 described above, when a user communicating with the communicating party terminal give a request for the multiparty connection designating a third party located at the local office as the communicating party terminal or a downstream office, the exchange receiving the request (the exchange at the office to which the requesting party terminal belongs) generates the call setup message for the multiparty connection and sends it to the downstream office. When receiving the call setup message for the multiparty connection, the exchange at the downstream office acquires the multiparty connection trunk 104 and connects the communicating party terminal and the terminal of the third party (or a relay trunk when the terminal of the third party is located at the downstream office) to the multiparty connection trunk 104. The interoffice multiparty connection according to the present invention is thus achieved.

An aspect of the interoffice multiparty connection implementing the present invention is described with reference to FIGS. 8 through 10. In the figures, reference numerals RT, ET, and TT indicate a requesting party terminal, a terminal (communicating party terminal) with which the requesting party terminal RT establishes communication, and a terminal of a third party, respectively. Reference numerals T1 through T6 indicate ISDN trunks for each office while ET indicates the multiparty connection trunk.

Figure 8A:
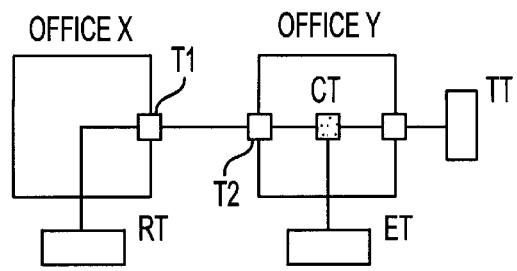
FIG. 8 is a block diagram illustrating examples of connection for interoffice multiparty connection.

FIG. 8(A) shows a connection pattern 1 in which the multiparty connection is achieved when a user at the terminal RT issues a multiparty connection request designating a third party (terminal TT) at an office Y after the communication has been established between the terminal RT at an office X and the communicating party terminal ET at the office Y.

Figure 8B:
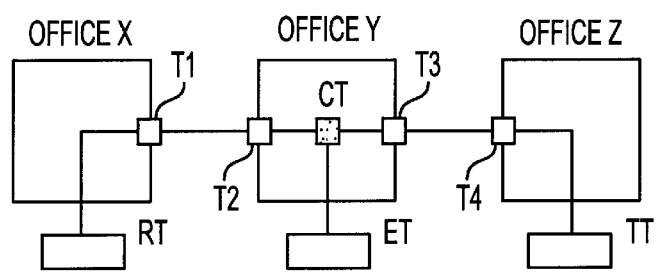

FIG. 8(B) shows a connection pattern 2 in which the multiparty connection is achieved when a user at the terminal RT issues the multiparty connection request designating a third party (terminal TT) at an office Z located downstream from the office Y after the communication has been established between the terminal RT at the office X and the communicating party terminal ET at the office Y.

Figure 8C:
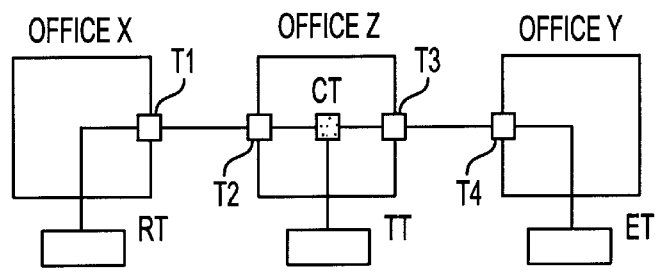

FIG. 8(C) shows a connection pattern 3 in which the multiparty connection is achieved when a user at the terminal RT issues the multiparty connection request designating a third party (terminal TT) at the office Z located between the offices X and Y after the communication has been established between the terminal RT at the office X and the communicating party terminal ET at the office Y.

Figure 8D:
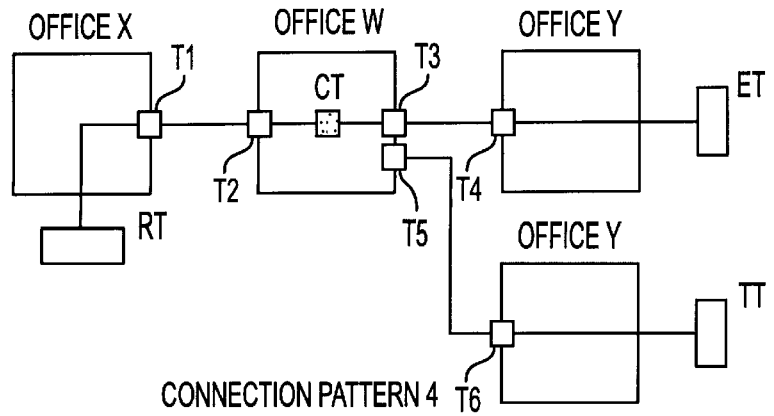

FIG. 8(D) shows a connection pattern 4 in which the multiparty connection is achieved when a user at the terminal RT issues a multiparty connection request designating a third party (terminal TT) at the office Z connected to a trunk office W after the communication has been established between the terminal RT at the office X and the communicating party terminal ET at the office Y through the office W.

FIG. 9 shows a connection pattern in the case where a multiparty connection acting processing is carried out. More specifically, the multiparty connection cannot be achieved at the office Y when a user at the terminal RT issues a multiparty connection request designating a third party (terminal TT) at the trunk office Y after the communication has been established between the terminal RT at the office X and the communicating party terminal ET at the office Y through the office Z and when the exchange at the office Y fails to acquire the multiparty connection trunk. In response to this, the exchange at the office Y requires the exchange at the office Z located upstream from the office Y to act the multiparty connection processing. When receiving the request, the exchange at the office Z acquires the multiparty connection trunk to establish the multiparty connection.

Figure 10:
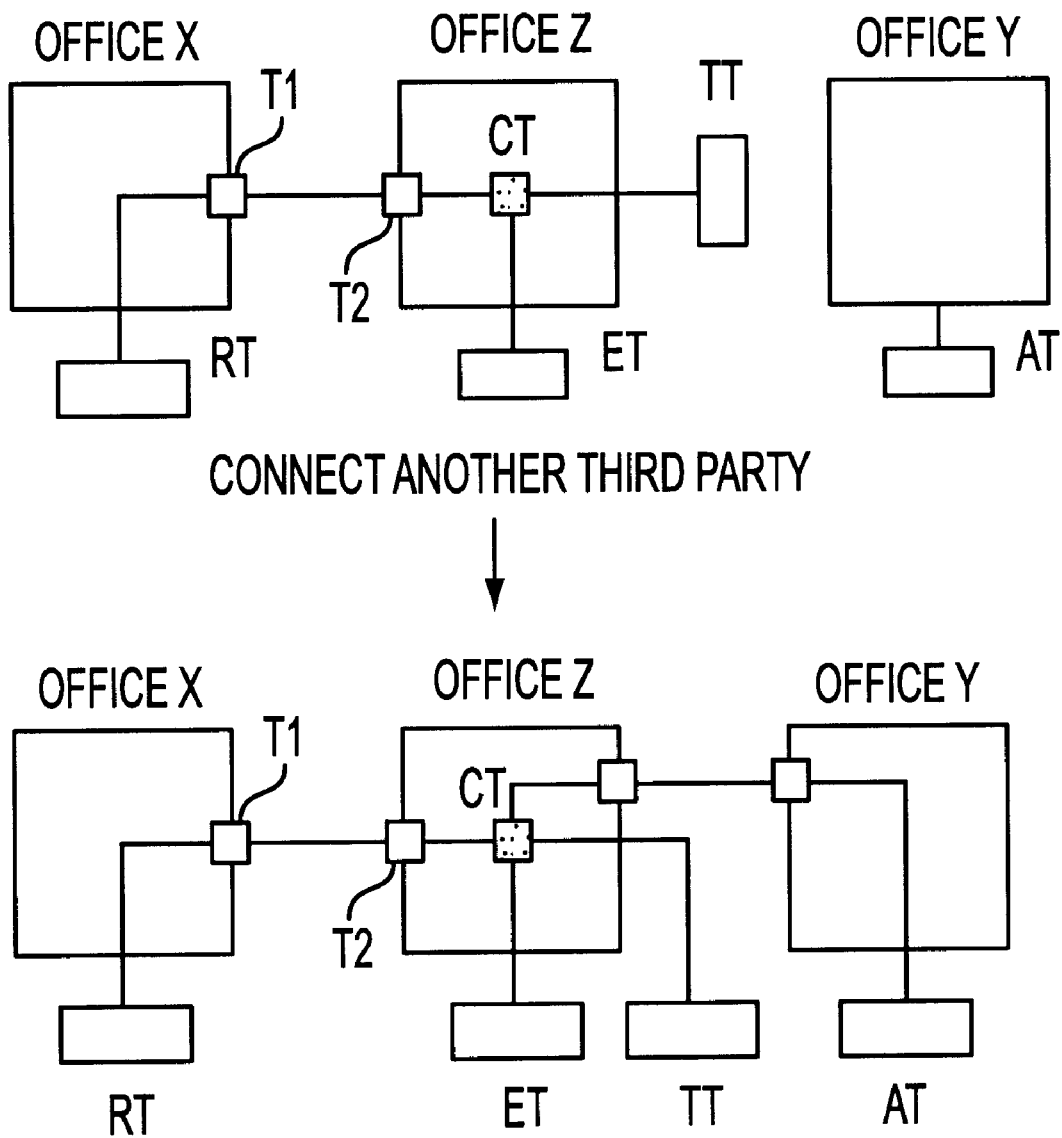
FIG. 10 is a block diagram for use in describing a processing to let an additional party join the multiparty connection that has already been established.

FIG. 10 shows a connection pattern in the case where an additional terminal is joined to the multiparty connection that has already been established. More specifically, this connection pattern is achieved when a user at the terminal RT issues a multiparty connection request designating another third party (terminal AT) at the office Y located downstream from the office Z after the communication has been established among the terminal ET and the terminal TT at the office Z and the terminal RT at the office X.

Operation of the exchange is now described below with reference to FIGS. 11 through 20.

Figure 11:
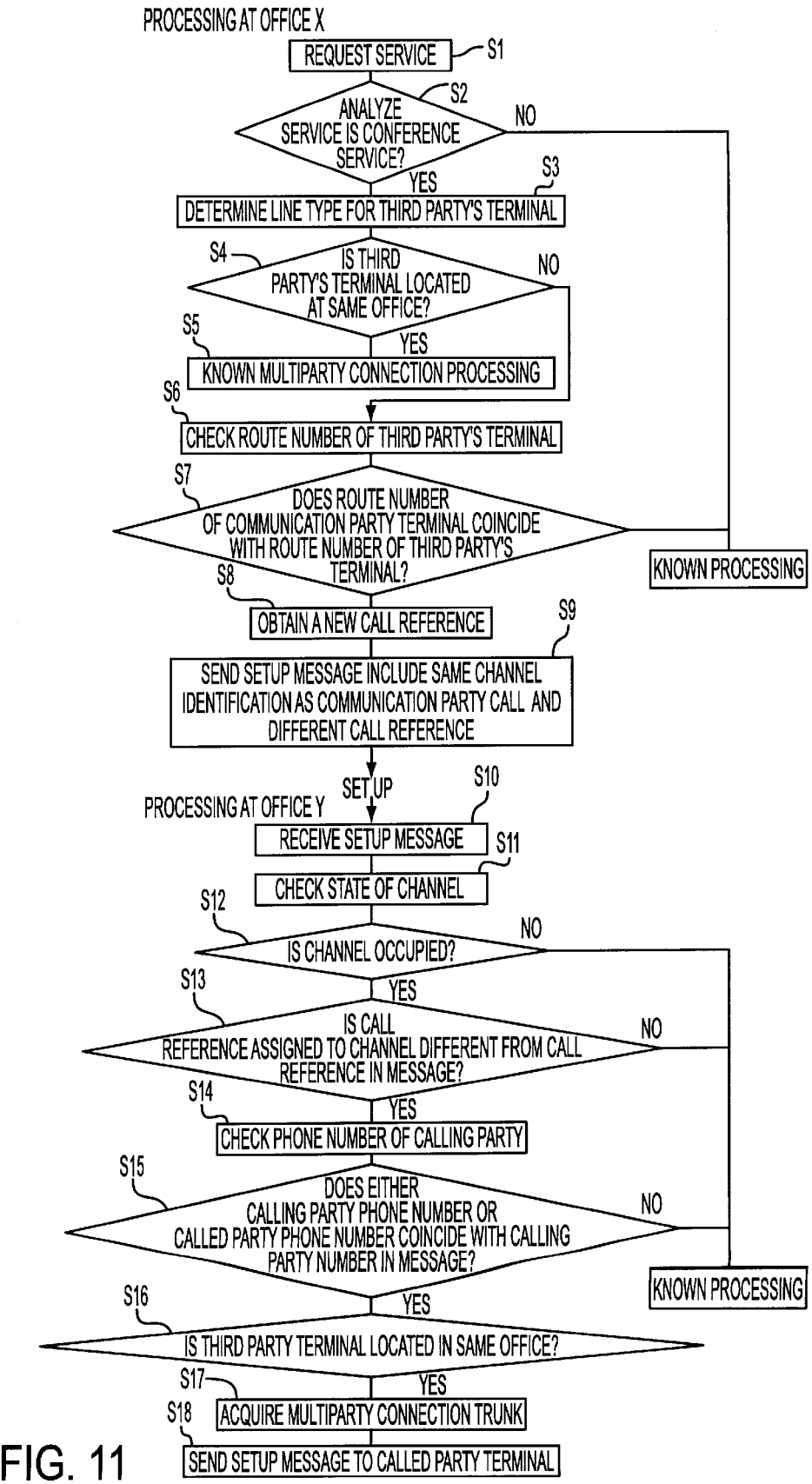
FIG. 11 is a flow chart illustrating a processing to be carried out during the first pattern of the multiparty connection.

Referring to FIG. 11, operation of the exchange is described for the case where the connection pattern 1 in FIG. 8 is achieved. A user at the terminal RT communicating with the communicating party terminal ET at the different office Y gives a request by hooking or with a certain number for the interoffice multiparty connection designating the terminal TT of the third party located at the office Y. The terminal TT may be designated by means of, for example, use's dialing the phone number of called party terminal TT from the terminal RT. The interoffice multiparty connection request is transmitted to the exchange 60 at the office X where the terminal RT is located (Step S1).

In the exchange 60, the interoffice multiparty connection control unit 110 of the central control unit 80 is activated.

The interoffice multiparty connection control unit 110 determines at step S2 by the multiparty connection request analysis unit 111 whether the request from the terminal RT is the interoffice multiparty connection request, i.e., the conference service request (Step S2). When the interoffice multiparty connection control unit 110 determines at the step S2 that the request from the terminal RT is the interoffice multiparty connection request, the multiparty connection request analysis unit 111 accesses the number plan table in the memory unit 90 to determine whether or not the line type for the terminal TT matches with the line type for the terminal RT (Step S3) When determining that the line type for the third party terminal TT matches with that of the terminal RT, the multiparty connection request analysis unit 111 determines whether or not the terminal TT is located at the local office, i.e., the office X (Step S4). When it is determined that the terminal TT is located at the local office, a known multiparty connection processing is carried out (Step S5). In FIG. 8(A) the terminal TT is located at the office Y, so that the negative result is obtained at the step S4 indicating that the terminal TT is located at a different office. The multiparty connection request analysis unit 111 of the central control unit 110 then accesses the route number table in the memory unit 90 using the phone number of the called party terminal TT and reads the route number of the terminal TT (Step S6).

Next, the multiparty connection request analysis unit 111 accesses the management data table in the memory unit 90 using the trunk number of the subscriber trunk to which the terminal RT is connected. The multiparty connection request analysis unit 111 then reads the route number of the communicating party terminal ET out of the management data table and compares the read route number with the route number of the terminal TT read out of the table previously (Step S7). If the step S7 is negative indicating that the route number of the terminal TT does not coincide with the route number of the communicating party terminal ET, the known multiparty connection processing is carried out. On the other hand, if the step S7 is affirmative indicating that the route number of the terminal TT coincides with the route number of the communicating party terminal ET, the multiparty connection request analysis unit 111 obtains a new call reference (Step S8). The new call reference is written as a third party's call reference into the management data table for the subscriber trunk to which the requesting party terminal RT is connected. The multiparty connection request analysis unit Ill generates a call setup message including the channel identification having the channel number of the channel occupied by the requesting party terminal RT, the newly obtained call reference, the calling party phone number requesting party terminal RT, and the called party phone number of the third party terminal TT. The generated call setup message is supplied to the route of the terminal TT (the local route of the communicating party terminal ET) through a control channel by the ISDN protocol communication control unit 120 (Step S9).

When receiving the call setup message (Step S10), the exchange at the office Y activates the interoffice multiparty connection control unit 110 of the central control unit 80. The message analysis unit 112 of the interoffice multiparty connection control unit 110 reads the channel identification out of the received call setup message. The message analysis unit 112 then looks up the channel state table in the memory unit 90 to determine whether the channel corresponding to the read channel identification is occupied (Steps S11 and S12). If the step S12 is negative the known multiparty connection processing is carried out. On the other hand, if the step S12 is positive indicating that the channel corresponding to the read channel identification is occupied, the call reference assigned to the occupied channel is compared with the call reference in the call setup message (Step S13). If the step S13 is negative, the known multiparty connection processing is carried out. On the other hand, if the step S13 is positive indicating that these two call references are different, it is determined that the received call setup message is the one for the multiparty connection. In this event, the multiparty connection request analysis unit 111 is activated to read the calling party phone number of the requesting party terminal RT out of the call setup message. The multiparty connection request analysis unit 111 then reads the telephone numbers of the calling and called parties out of the channel state table in the memory unit 90 (Step S14). Next, the multiparty connection request analysis unit 111 determines whether either one of them coincides with the calling party phone number of the requesting party terminal (Step S15). When the step S15 is negative, the known multiparty connection processing is conducted. On the other hand, when the step S15 is positive, the multiparty connection request analysis unit 111 determines whether the third party terminal TT is located at the local office (Step s16). In the pattern 1 in FIG. 8 the third party terminal TT is located at the office Y, so that the multiparty connection request analysis unit 111 determines at the step S16 that the third party terminal TT is located at the local office. In this event, the multiparty connection unit 113 is activated to acquire the multiparty connection trunk 104 (Step S17). Then the multiparty connection unit 111 connects the communication call between the requesting party terminal RT and the communicating party terminal ET to the multiparty connection trunk 104. In addition, the multiparty connection unit 113 sends the call setup message to the terminal TT to call the latter (Step S18). When the terminal TT responds to the call, the multiparty connection unit 113 connects the terminal TT to the multiparty connection trunk 104.

The above mentioned processing provides the multiparty connection of the pattern 1 in FIG. 8(A).

Figure 12:
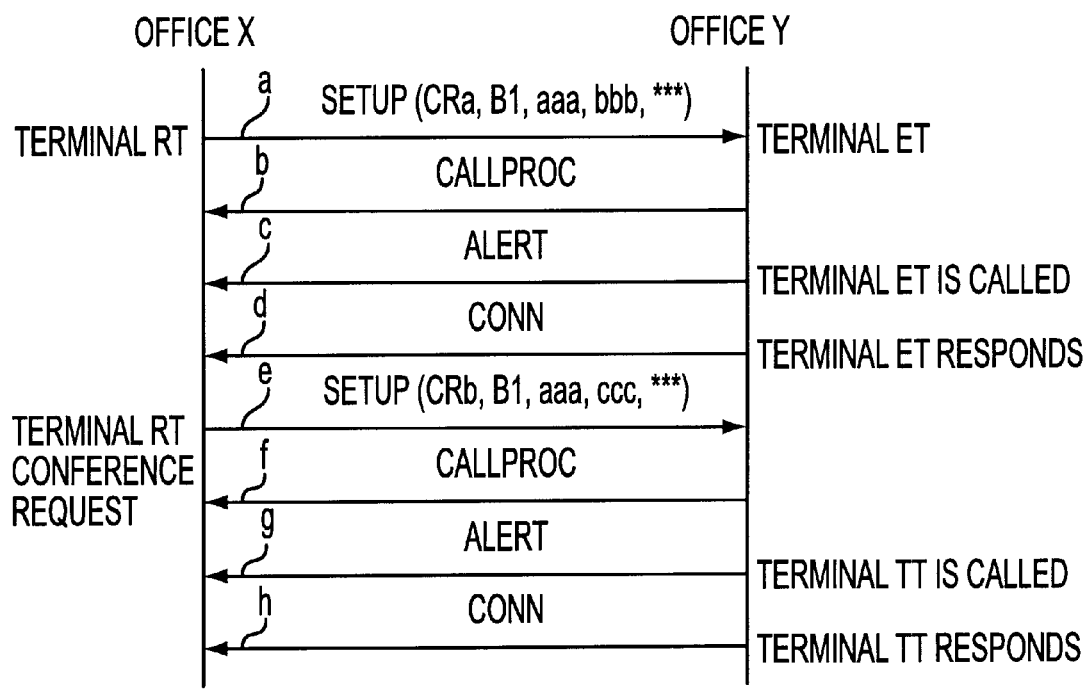
FIG. 12 is a sequence diagram illustrating a signal transmitted and received among offices during the first pattern of the multiparty connection.

FIG. 12 shows a sequence of a signal transmitted and received between the offices X and Y when the above mentioned connection pattern 1 is achieved. In this figure, "aaa" indicates the phone number of the terminal RT at the office X while "bbb" and "ccc" indicate phone numbers of the communicating party terminal ET at the office Y and the third party terminal TT, respectively. The channel identification of the channel used for the communication between the terminals RT and ET is indicated by "B1". The call reference is indicated by "CRa".

Symbols "a" through "d" indicate signals transmitted and received until communication is established between the terminals RT and ET. Symbols "e" through "h" indicate signals transmitted and received until the multiparty connection is established between the terminals RT and ET. More specifically, the office X sends to office Y a call setup message (SET UP(CRa, B1, aaa, bbb, . . . )) including the communication call reference (CRa), the channel identification (B1), the phone number of the terminal RT (aaa), and the phone number of the terminal ET (bbb), which corresponds to the symbol "a" in the figure. When receiving the call setup message (SET UP(CRa, B1, aaa, bbb, . . . )), the office Y sends a call setup acceptance message (CALLPROC) to the office X (symbol "b" in the figure), and then sends to the office X a message (ALERT) indicating the call state of the terminal ET (symbol "c" in the figure). When the terminal ET responds to the call, the office Y sends to the office X a message (CONN) indicating that the terminal ET responds (connects) (symbol "d" in the figure). At that time, the communication is established between the terminals RT and ET.

The terminal RT sends an interoffice multiparty connection request to the exchange at the office X, the exchange at the office X sends to the office Y the call setup message (SET UP(CRb, B1, aaa, ccc, . . . )) including the communication call reference (CRb), the channel identification (B1), the phone number of the terminal RT (aaa), and the phone number of the third party terminal TT (ccc), which corresponds to the symbol "e" in the figure. When receiving the call setup message (SET UP(CRb, B1, aaa, ccc, . . . )), the office Y sends the call setup acceptance message (CALLPROC) to the office X (symbol "f" in the figure). The office Y then sends the message (ALERT) indicating the call state of the third party terminal TT to the office X (symbol "g" in the figure). When the terminal TT responds to the call, the office Y sends to the office X the message (CONN) indicating that the terminal TT responds (connects) (symbol "h" in the figure).

Figure 13:
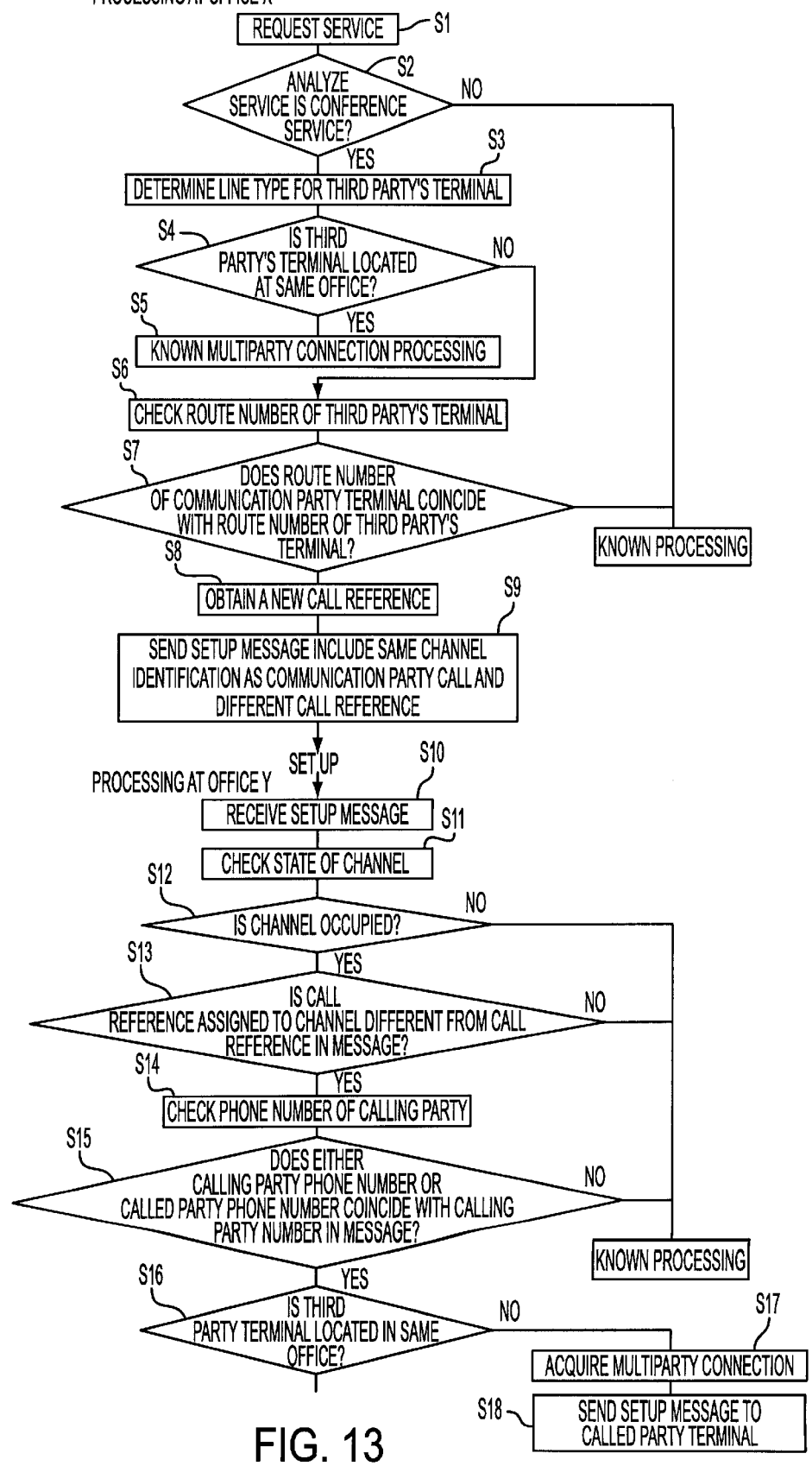
FIG. 13 is a flow chart illustrating a processing to be carried out during the second pattern of the multiparty connection.

Next, described with FIG. 13 is operation carried out by the exchange to achieve the multiparty connection of the pattern 2 in FIG. 8(B). In this figure, operations of steps S1 through S16 are similar to those in FIG. 11 and description of such steps are omitted here.

For the pattern 2 in FIG. 8, the third party terminal TT is located at the office Z rather than the office Y. Accordingly, the multiparty connection request analysis unit 111 determines at the step S16 that the third party terminal TT is not located at the local office. In this event, the multiparty connection unit 113 is activated to acquire the multiparty connection trunk 104 (Step S17). The multiparty connection unit 113 then connects the communication call between the requesting party terminal RT and the communicating party terminal ET to the multiparty connection trunk 104. In addition, the multiparty connection unit 113 sends to the office Z the call setup message addressed to the terminal TT to call the latter (Step S18). When the terminal TT responds to the call, call is established between the terminal TT and the ISDN trunk 102 at the office Y. Then, the multiparty connection unit 113 connects the ISDN trunk 102 connected to the terminal TT to the multiparty connection trunk 104. The above mentioned processing provides the multiparty connection of the pattern 2 in FIG. 8(B).

Figure 14:
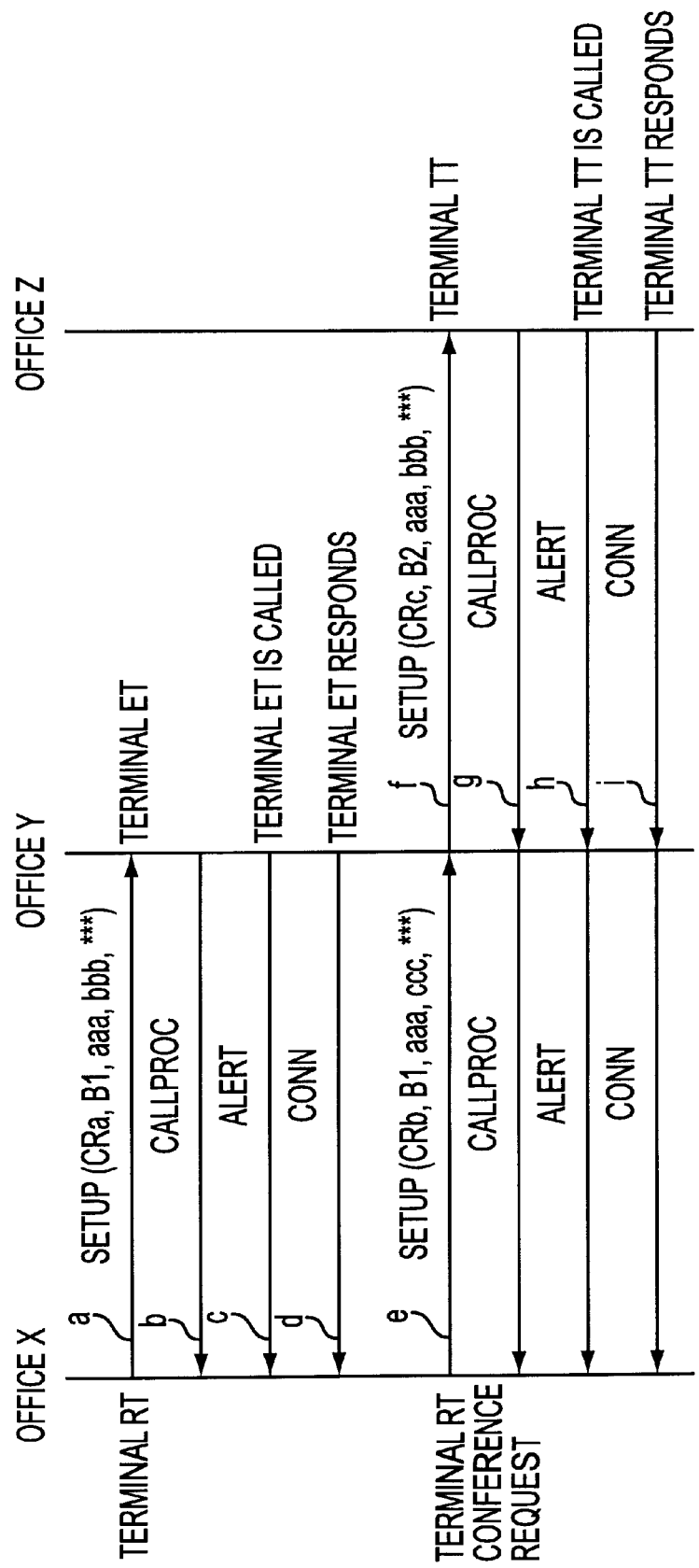
FIG. 14 is a sequence diagram illustrating a signal transmitted and received among offices during the second pattern of the multiparty connection.

FIG. 14 shows a sequence of a signal transmitted and received between the offices X, Y and Z when the above mentioned connection pattern 1 is achieved. In this figure, "aaa" indicates the phone number of the terminal RT at the office X while "bbb" and "ccc" indicate phone numbers of the communicating party terminal ET at the office Y and the third party terminal TT at the office Z, respectively. The channel identification of the channel used for the communication between the terminals RT and ET is indicated by "B1" while "CRa" indicates a call reference of the call between the terminals RT and ET.

Symbols "a" through "d" indicate signals transmitted and received until communication is established between the terminals RT and ET. Symbols "e" through "i" indicate signals transmitted and received until the multiparty connection is established between the terminals RT and ET. More specifically, the office X sends to office Y a call setup message (SET UP(CRa, B1, aaa, bbb, . . . )) including the communication call reference (CRa), the channel identification (B1), the phone number of the terminal RT (aaa), and the phone number of the terminal ET (bbb), which corresponds to the symbol "a" in the figure. When receiving the call setup message (SET UP(CRa, Bi, aaa, bbb, . . . )), the office Y sends a call setup acceptance message (CALLPROC) to the office X (symbol "b" in the figure), and then sends to the office X a message (ALERT) indicating the call state of the terminal ET (symbol "c" in the figure). When the terminal ET responds to the call, the office Y sends to the office X a message (CONN) indicating that the terminal ET responds (connects) (symbol "d" in the figure). At that time, the communication is established between the terminals RT and ET.

The terminal RT sends an interoffice multiparty connection request to the exchange at the office X, the exchange at the office X sends to the office Y the call setup message (SET UP(CRb, B1, aaa, ccc, . . . )) including the communication call reference (CRb), the channel identification (B1), the phone number of the terminal RT (aaa), and the phone number of the third party terminal TT (ccc), which corresponds to the symbol "e" in the figure. When receiving the call setup message (SET UP(CRb, B1, aaa, ccc, . . . )), the office Y generates the call setup message (SET UP(CRc, B2, aaa, ccc, . . . )) addressed to the terminal TT and sends it to the office Z (symbol "f" in the figure). The office Z then sends the call setup acceptance message (CALLPROC) to the office Y, and the office Y in turn sends the received call setup acceptance message (CALLPROC) to the office X (symbol "g" in the figure). The office Z then sends the message (ALERT) indicating the call state of the third party terminal TT to the office Y, and the office Y in turn sends the received message (ALERT) to the office X (symbol "h" in the figure). When the terminal TT responds to the call, the office Z sends to the office Y the message (CONN) indicating that the terminal TT responds (connects), and the office Y in turn sends the received message (CONN) to the office X (symbol "i" in the figure).

Figure 15:
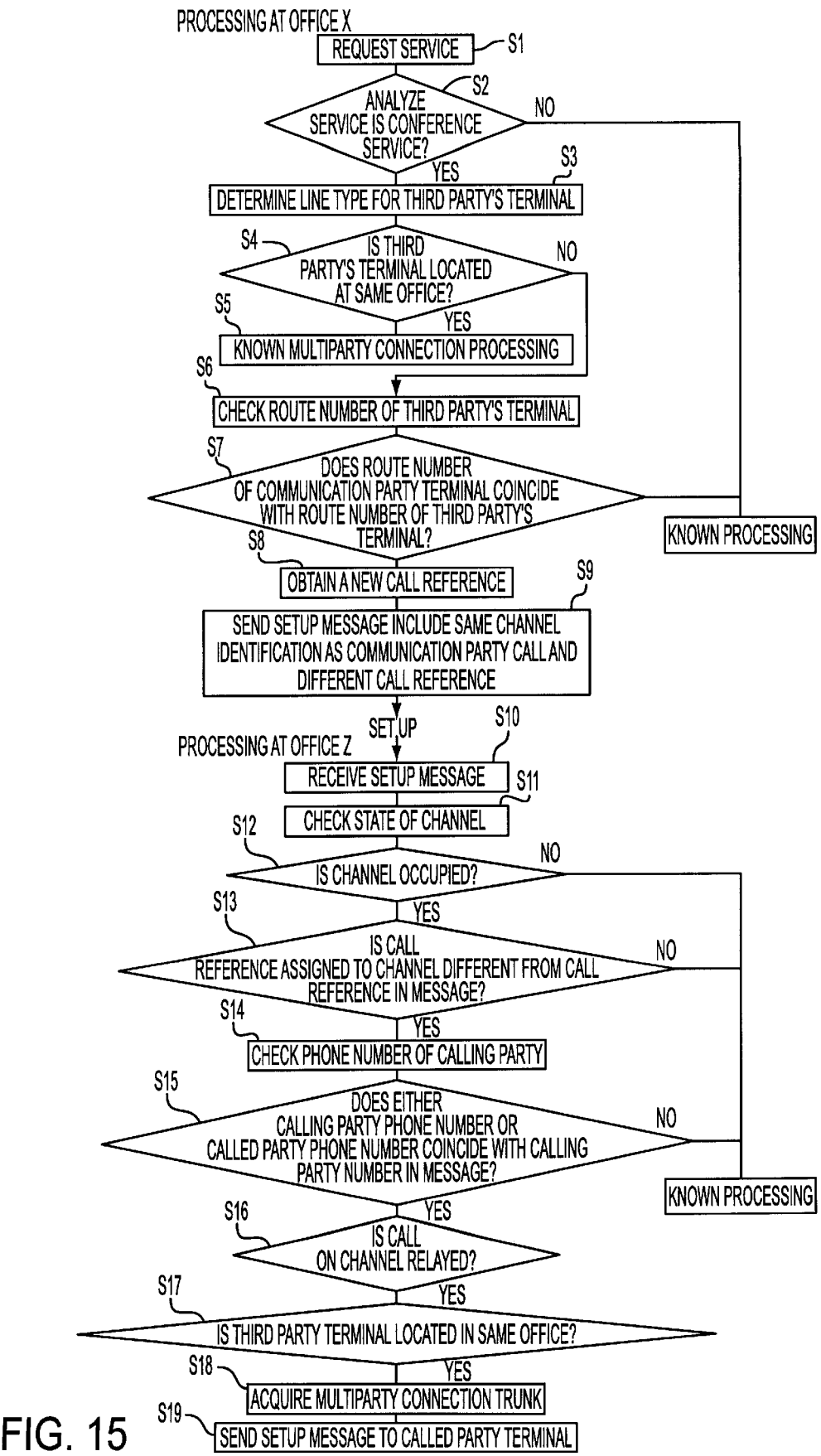
FIG. 15 is a flow chart illustrating a processing to be carried out during the third pattern of the multiparty connection.

FIG. 15 is a flow chart illustrating operation carried out by the exchange to achieve the multiparty connection of the pattern 3 in FIG. 8. In this figure, the steps S1 through S9 are carried out by the exchange at the office X and are similar to those described in conjunction with FIG. 11. Accordingly, description of such steps is omitted here.

For the pattern 3 in FIG. 8, the office Z where the third party terminal is located is a trunk office between the offices X and Y, so that the call setup message supplied from the exchange at the office X is received by the exchange at the office Z.

When receiving the call setup message (Step S10), the exchange at the office Z activates the interoffice multiparty connection control unit 110 of the central control unit 80. The message analysis unit 112 of the interoffice multiparty connection control unit 110 reads the channel identification out of the received call setup message. The message analysis unit 112 then looks up the channel state table in the memory unit 90 to determine whether the channel corresponding to the read channel identification is occupied (Steps S11 and S12). If the step S12 is negative the known multiparty connection processing is carried out. On the other hand, if the step S12 is positive indicating that the channel corresponding to the read channel identification is occupied, the call reference assigned to the occupied channel is compared with the call reference in the call setup message (Step S13). If the step S13 is negative, the known multiparty connection processing is carried out. On the other hand, if the step S13 is positive indicating that these two call references are different, it is determined that the received call setup message is the one for the multiparty connection. In this event, the multiparty connection request analysis unit 111 is activated to read the calling party phone number of the requesting party terminal RT out of the call setup message. The multiparty connection request analysis unit 111 then reads the phone numbers of the calling and called parties out of the channel state table in the memory unit 90 (Step S14). Next, the multiparty connection request analysis unit 111 determines whether either one of them coincides with the calling party phone number of the requesting party terminal (Step S15). When the step S15 is negative, the known multiparty connection processing is conducted. On the other hand, when the step S15 is positive, the multiparty connection request analysis unit 111 determines whether the third party terminal TT is located at the local office (Step S16). In the pattern 3 in FIG. 8, the call on the channel indicated by the channel identification in the call setup message is relayed. Therefore, it is determined at the step S16 that the call on the above mentioned channel is relayed. In this event, the multiparty connection request analysis unit 111 determines whether the third party terminal TT is located at the local office Z (Step S17). In the pattern 3 in FIG. 8 the third party terminal TT is located at the office Z, so that the multiparty connection request analysis unit 111 determines at the step S17 that the third party terminal TT is located at the office Z. The multiparty connection unit 113 is activated to acquire the multiparty connection trunk 104 (Step S18). Then the multiparty connection unit 111 connects the communication call between the requesting party terminal RT and the communicating party terminal ET to the multiparty connection trunk 104. In addition, the multiparty connection unit 113 sends the call setup message to the terminal TT. When the terminal TT responds to the call, the multiparty connection unit 113 connects the terminal TT to the multiparty connection trunk 104.

The above mentioned processing provides the multiparty connection of the pattern 3 in FIG. 8(C).

Figure 16:
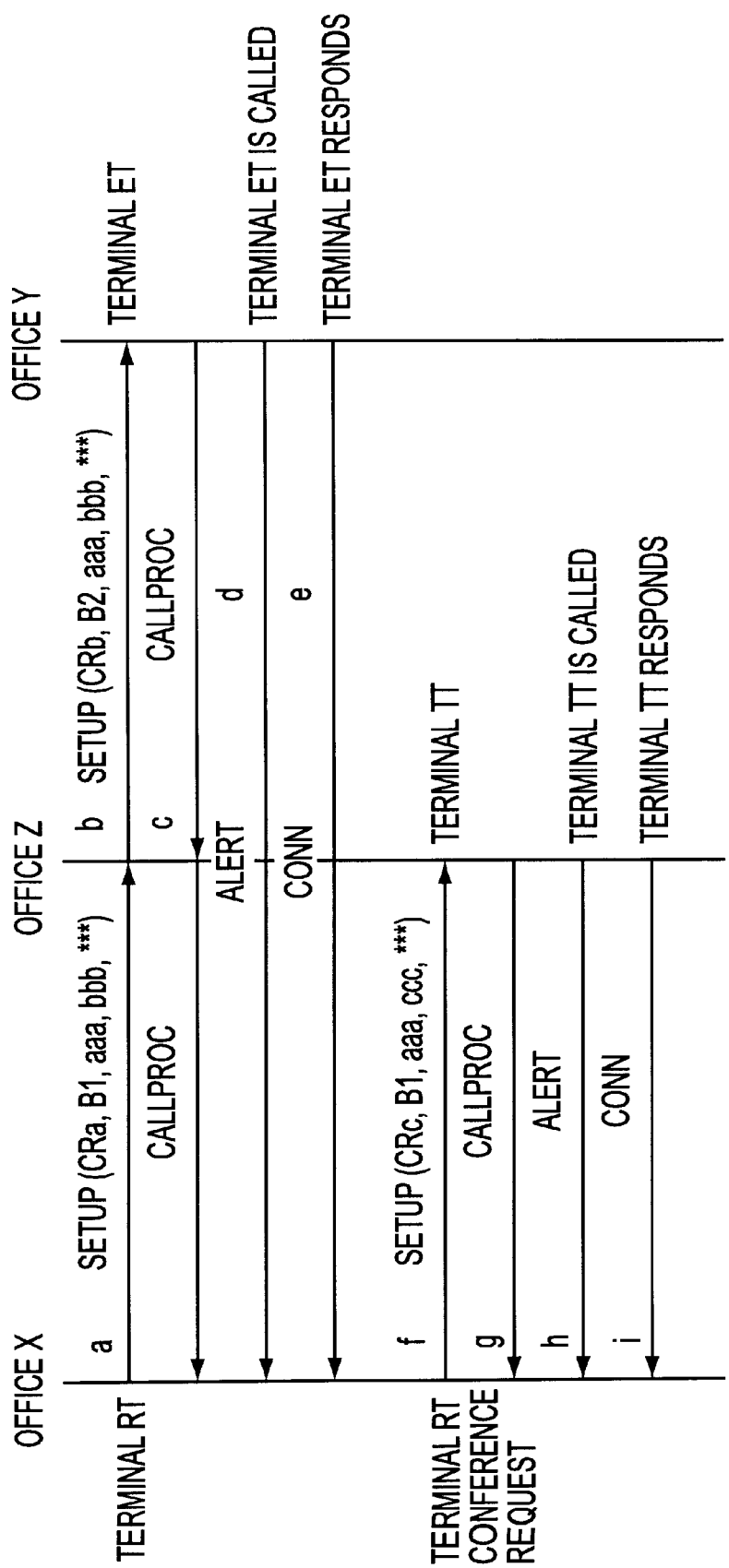
FIG. 16 is a sequence diagram illustrating a signal transmitted and received among offices during the third pattern of the multiparty connection.

FIG. 16 shows a sequence of a signal transmitted and received between the offices X, Y and Z when the above mentioned connection pattern 3 is achieved. In this figure, "aaa" indicates the phone number of the terminal RT at the office X while "bbb" and "ccc" indicate phone numbers of the communicating party terminal ET at the office Y and the third party terminal TT at the office Z, respectively. The channel identifications of the channels used for the communication between the terminals RT and ET are indicated by "B1" and "B2" for the channels between the offices X and Z and the channels between the offices Z and Y, respectively. The call references of the call used for the communication between the terminals RT and ET are "CRa" and "CRb" for the channels between the offices X and Z and the channels between the offices Z and Y, respectively.

Symbols "a" through "e" indicate signals transmitted and received until communication is established between the terminals RT and ET. Symbols "f" through "i" indicate signals transmitted and received until the multiparty connection is established between the terminals RT and ET. More specifically, the office X sends to office Z a call setup message (SET UP(CRa, B1, aaa, bbb, . . . )) including the communication call reference (CRa), the channel identification (B1), the phone number of the terminal RT (aaa), and the phone number of the terminal ET (bbb), which corresponds to the symbol "a" in the figure. When receiving the call setup message (SET UP(CRa, B1, aaa, bbb, . . . )), the office Z determines that the received message is addressed to the office Y located downstream from the office Z and generates a new call setup message. This call setup message (SET UP(CRb, B2, aaa, bbb, . . . )) includes the communication call reference (CRb), the channel identification (B2), the phone number of the terminal RT (aaa), and the phone number of the terminal ET (bbb). The exchange at the office Z sends the generated call setup message (SET UP(CRb, B2, aaa, bbb, . . . )) to the office Y, which corresponds to the symbol "b" in the figure.

When receiving the call setup message (SET UP(CRb, B2, aaa, bbb, . . . )), the exchange at the office Y sends a call setup acceptance message (CALLPROC) to the office Z. The exchange at the office Z relays the received call setup acceptance message (CALLPROC) to the office X (symbol "c" in the figure). The exchange at the office Y then sends a message (ALERT) to the office Z. The exchange at the office Z relays the received message (ALERT) to the office X (symbol "d" in the figure). When the terminal ET responds to the call, the office Y sends to the office Z a message (CONN) indicating that the terminal ET responds (connects). The exchange at the office Z relays the received message (CONN) to the office X (symbol "e" in the figure). At that time, the communication is established between the terminals RT and ET.

When the terminal RT sends an interoffice multiparty connection request to the exchange at the office X, the exchange at the office X sends to the office Z the call setup message (SET UP(CRc, B1, aaa, ccc, . . . )) including the communication call reference (CRc), the channel identification (B1), the phone number of the terminal RT (aaa), and the phone number of the third party terminal TT (ccc), which corresponds to the symbol "f" in the figure. When receiving the call setup message (SET UP(CRc, B1, aaa, ccc, . . . )), the exchange at the office Z determines that the destination of this message is the terminal TT located in the local office and sends the call setup acceptance message (CALLPROC) to the office X (symbol "g" in the figure). The exchange at the office Z then sends the message (ALERT) indicating the call state of the third party terminal TT to the office X (symbol "h" in the figure). When the terminal TT responds to the call, the exchange at the office Z sends to the office X the message (CONN) indicating that the terminal TT responds (connects).

Figure 17:
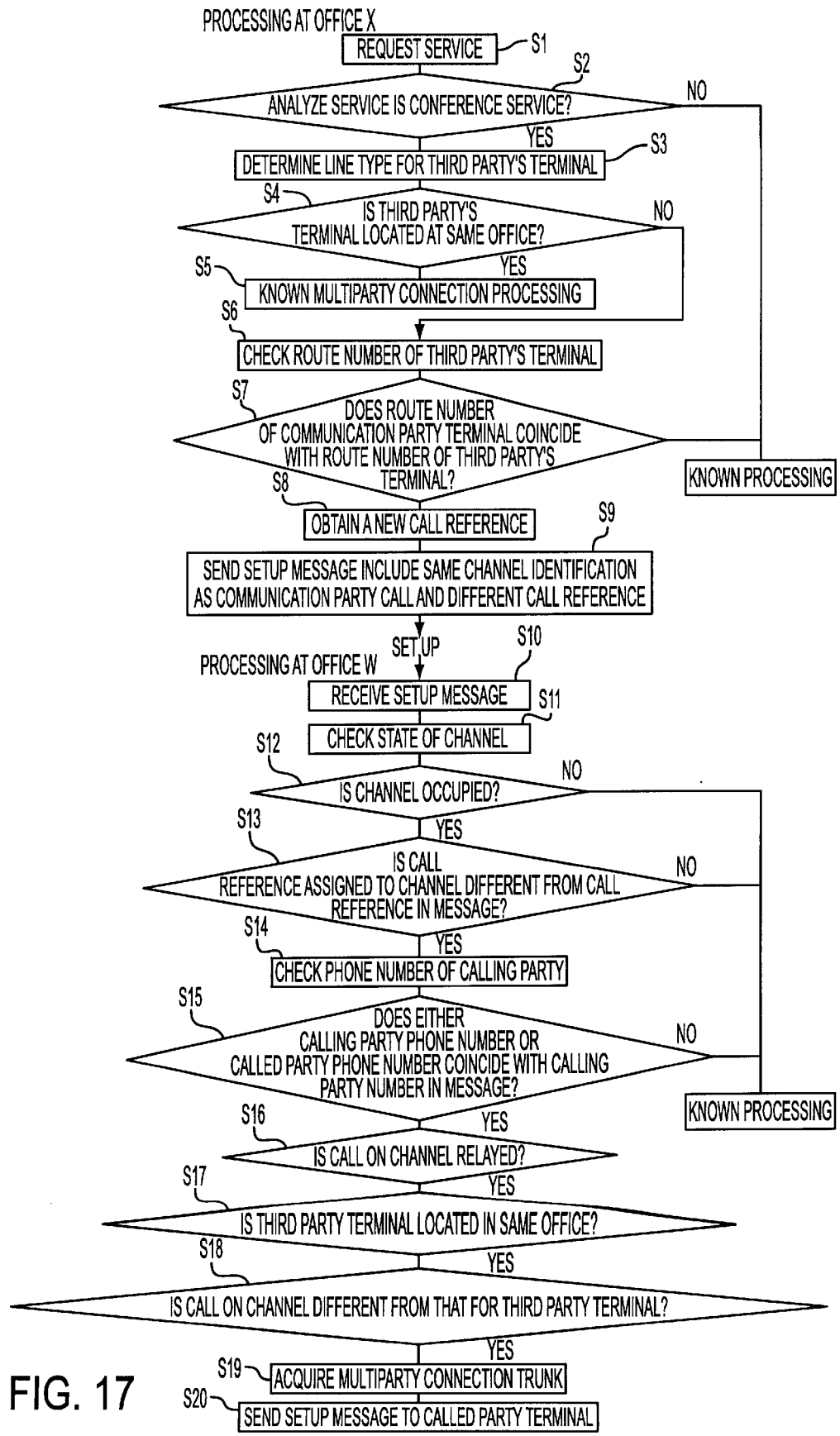
FIG. 17 is a flow chart illustrating a processing to be carried out during the fourth pattern of the multiparty connection.

FIG. 17 is a flow chart illustrating operation carried out by the exchange to achieve the multiparty connection of the pattern 4 in FIG. 8. In this figure, the steps S1 through S9 are carried out by the exchange at the office X and are similar to those described in conjunction with FIG. 11. Accordingly, description of such steps is omitted here.

For the pattern 4 in FIG. 8, the communication is established between the office X where the terminal RT is located and the office Y where the terminal ET is located through the trunk office W. In addition, the office Z where the third party terminal TT is located is downstream from the trunk office W. The call setup message supplied from the exchange at the office X for the multiparty connection is received by the trunk office W.

When receiving the call setup message (Step S10), the exchange at the office W activates the interoffice multiparty connection control unit 110 of the central control unit 80. The message analysis unit 112 of the interoffice multiparty connection control unit 110 reads the channel identification out of the received call setup message. The message analysis unit 112 then looks up the channel state table in the memory unit 90 to determine whether the channel corresponding to the read channel identification is occupied (Steps S11 and S12). If the step S12 is negative the known multiparty connection processing is carried out. On the other hand, if the step S12 is positive indicating that the channel corresponding to the read channel identification is occupied, the call reference assigned to the occupied channel is compared with the call reference in the call setup message (Step S13). If the step S13 is negative, the known multiparty connection processing is carried out. On the other hand, if the step S13 is positive indicating that these two call references are different, it is determined that the received call setup message is the one for the multiparty connection. In this event, the multiparty connection request analysis unit 111 is activated to read the calling party phone number of the requesting party terminal RT out of the call setup message. The multiparty connection request analysis unit 111 then reads the phone numbers of the calling and called parties out of the channel state table in the memory unit 90 (Step S14). Next, the multiparty connection request analysis unit 111 determines whether either one of them coincides with the calling party phone number of the requesting party terminal (Step S15). When the step S15 is negative, the known multiparty connection processing is conducted. On the other hand, when the step S15 is positive, the multiparty connection request analysis unit 111 determines whether the third party terminal TT is located at the local office (Step S16). In the pattern 4 in FIG. 8, the call on the channel indicated by the channel identification in the call setup message is relayed. Therefore, it is determined at the step S16 that the call on the above mentioned channel is relayed. In this event, the multiparty connection request analysis unit 111 determines whether the third party terminal TT is located at the local office Z (Step S17). In the pattern 4 in FIG. 8 the third party terminal TT is located at the office Z, so that the multiparty connection request analysis unit 111 determines at the step S17 that the third party terminal TT is not located at the office W. The multiparty connection request analysis unit 111 compares the route for the third party terminal TT with the route for the communicating party terminal ET (Step S18). In the pattern 4 in FIG. 8, the routes for the terminals TT and ET are different from each other, so that it is determined at the step S18 that these routes are different. As a result, the multiparty connection unit 113 is activated to acquire the multiparty connection trunk 104 (Step S19). Then the multiparty connection unit 111 connects the communication call between the terminal RT and the communicating party terminal ET to the multiparty connection trunk 104. In addition, the multiparty connection unit 113 sends to the office Z the call setup message addressed to the third party terminal TT to call the latter (Step S20). When the terminal TT responds to the call, the call is established between the terminal TT and the ISDN trunk 102 at the terminal W. Then, the multiparty connection unit 113 connects the ISDN trunk 102 connected to the terminal TT to the multiparty connection trunk 104.

The above mentioned processing provides the multiparty connection of the pattern 4 in FIG. 8(D).

Figure 18:
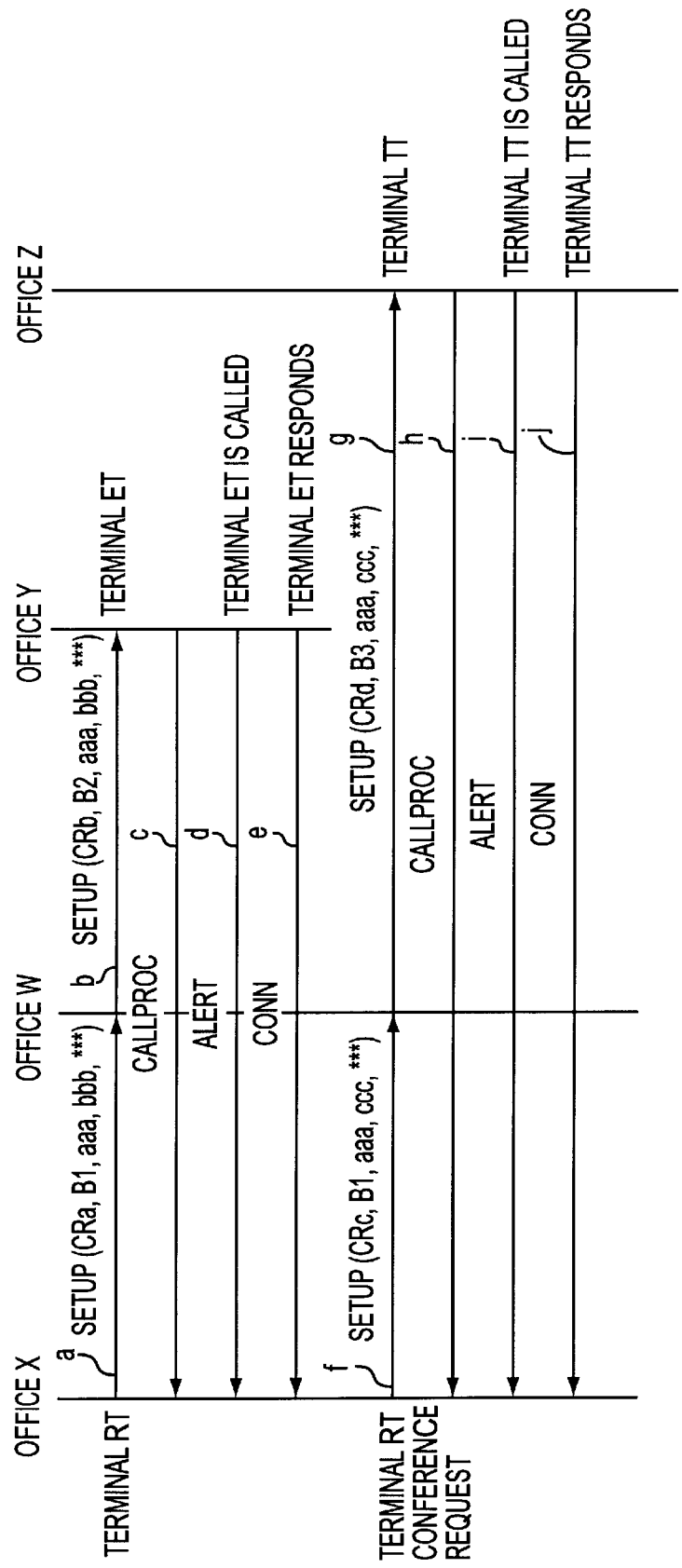
FIG. 18 is a sequence diagram illustrating a signal transmitted and received among offices during the fourth pattern of the multiparty connection.

FIG. 18 shows a sequence of a signal transmitted and received between the offices X, Y and Z when the above mentioned connection pattern 4 is achieved. In this figure, "aaa" indicates the phone number of the terminal RT at the office X while "bbb" and "ccc" indicate phone numbers of the communicating party terminal ET at the office Y and the third party terminal TT at the office Z, respectively. The channel identifications of the channels used for the communication between the terminals RT and ET are indicated by "B1" and "B2" for the channels between the offices X and W and the channels between the offices W and Y, respectively. The call references of the call used for the communication between the terminals RT and ET are "CRa" and "CRb" for the channels between the offices X and W and the channels between the offices W and Y, respectively.

Symbols "a" through "e" indicate signals transmitted and received until communication is established between the terminals RT and ET. Symbols "f" through "i" indicate signals transmitted and received until the multiparty connection is established between the terminals RT and ET. More specifically, the office X sends to office W a call setup message (SET UP(CRa, B1, aaa, bbb, . . . )) including the communication call reference (CRa), the channel identification (B1), the phone number of the terminal RT (aaa), and the phone number of the terminal ET (bbb), which corresponds to the symbol "a" in the figure. When receiving the call setup message (SET UP(CRa, B1, aaa, bbb, . . . )), the office W determines that the received message is addressed to the office Y located downstream from the office Z and generates a new call setup message. This call setup message (SET UP(CRb, B2, aaa, bbb, . . . )) includes the communication call reference (CRb), the channel identification (B2), the phone number of the terminal RT (aaa), and the phone number of the terminal ET (bbb). The exchange at the office W sends the generated call setup message (SET UP(CRb, B2, aaa, bbb, . . . )) to the office Y, which corresponds to the symbol "b" in the figure.

When receiving the call setup message (SET UP(CRb, B2, aaa, bbb, . . . )), the exchange at the office Y sends a call setup acceptance message (CALLPROC) to the office W. The exchange at the office W relays the received call setup acceptance message (CALLPROC) to the office X (symbol "c" in the figure). The exchange at the office Y then sends a message (ALERT) to the office W. The exchange at the office W relays the received message (ALERT) to the office X (symbol "d" in the figure). When the terminal ET responds to the call, the office Y sends to the office W a message (CONN) indicating that the terminal ET responds (connects). The exchange at the office W relays the received message (CONN) to the office X (symbol "e" in the figure). At that time, the communication is established between the terminals RT and ET.

When the terminal RT sends an interoffice multiparty connection request to the exchange at the office X, the exchange at the office X sends to the office W the call setup message (SET UP(CRc, B1, aaa, ccc, . . . )) including the communication call reference (CRc), the channel identification (B1), the phone number of the terminal RT (aaa), and the phone number of the third party terminal TT (ccc), which corresponds to the symbol "f" in the figure. When receiving the call setup message (SET UP(CRc, B1, aaa, ccc, . . . )), the exchange at the office W determines that the destination of this message is the terminal TT located at the office Z downstream from the office W and that the routes for the terminals ET and TT are different from each other. The exchange at the office W then sends to the office Z a call setup message (SET UP(CRd, aaa, ccc, . . . )) addressed to the terminal TT (symbol "g" in the figure). When receiving the call setup message (SET UP(CRd, aaa, ccc, . . . )), the exchange at the office Z sends the call setup acceptance message (CALLPROC) to the office W (symbol "g" in the figure). The office W in turn relays the received call setup acceptance message (CALLPROC) to the office X (symbol "h" in the figure). The exchange at the office Z sends the message (ALERT) indicating the call state of the third party terminal TT to the office W. The office W in turn relays the received call setup acceptance message (ALERT) to the office X (symbol "i" in the figure). When the terminal TT responds to the call, the exchange at the office Z sends to the office W the message (CONN) indicating that the terminal TT responds (connects). The office W in turn relays the received call setup acceptance message (CONN) to the office X (symbol "j" in the figure).

Figure 19:
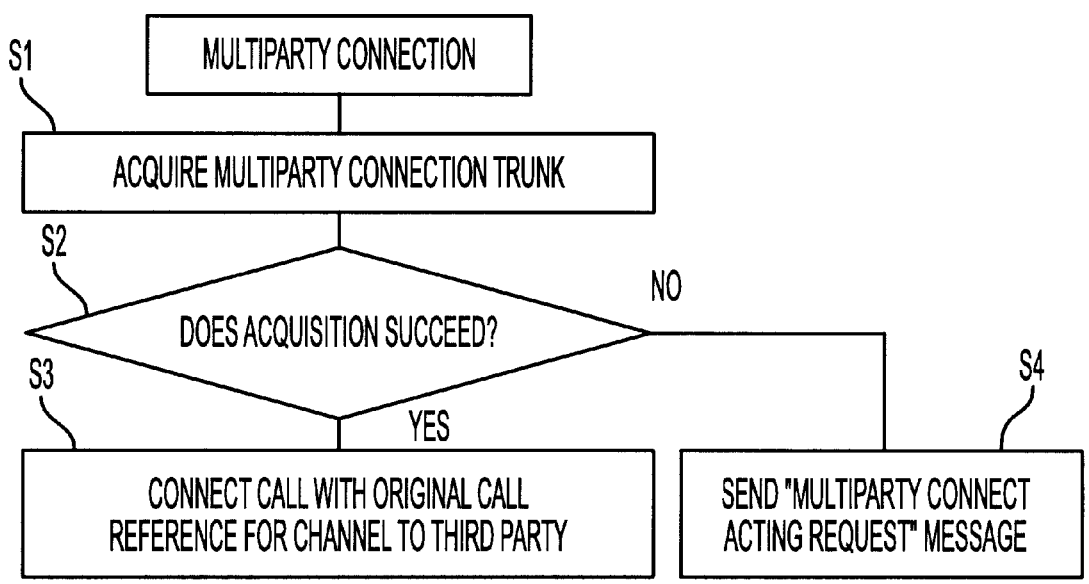
FIG. 19 is a flow chart illustrating a processing to be carried out to achieve the pattern in FIG. 9.

FIG. 19 is a flow chart illustrating operation carried out by the exchange to achieve the multiparty connection of the pattern in FIG. 9. In the pattern in FIG. 9, the exchange at the office Y requests an exchange at the upstream office Z to act the multiparty connection processing when it fails to acquire the multiparty connection trunk. More specifically, at the office Y, the multiparty connection unit 113 tries to acquire the multiparty connection trunk 104 (Step S1). The multiparty connection acting processing unit 115 is activated to determine whether the multiparty connection unit 113 succeeds the acquisition of the multiparty connection trunk 104 (Step S2). When the step S2 is positive indicating that the multiparty connection trunk 104 is acquired, the multiparty connection unit 113 carries out the above mentioned multiparty connection processing. On the other hand, if the multiparty connection unit 113 fails to acquire the trunk 104 as described in conjunction with FIG. 9, the multiparty connection acting processing unit 115 issues a request to the exchange at the upstream office Z for the acting of the multiparty connection processing (Step S4).

When receiving the multiparty connection acting processing request from the downstream office Y, the office Z acquires the multiparty connection trunk 104 by the multiparty connection acting processing unit 115 to connect the related call. The above mentioned processing provides the multiparty connection having the pattern illustrated in FIG. 9.

Figure 20:
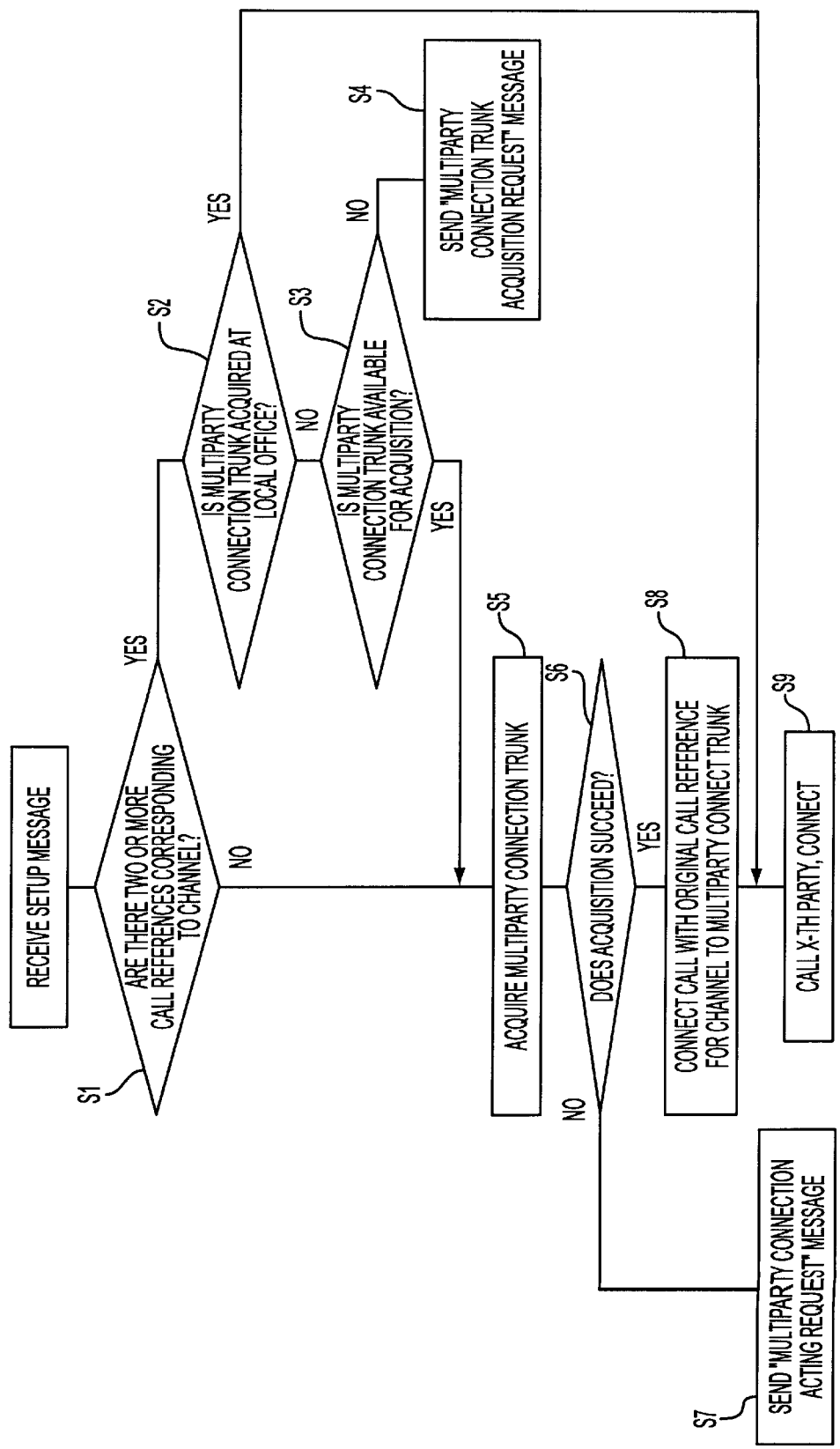
FIG. 20 is a flow chart illustrating a processing to be carried out to achieve the pattern FIG. 10.

FIG. 20 is a flow chart illustrating operation carried out by the exchange to achieve the multiparty connection of the pattern in FIG. 10. In FIG. 10, the multiparty connection is established among the terminal RT located at the office X, the terminal ET located at the office Z, and the terminal TT located at the office Z. When the interoffice multiparty connection request is generated by the terminal RT, designating another terminal AT located at the office Y, the exchange at the office X sends the call setup message for the multiparty connection to the exchange at the office Z.

When receiving the call setup message for the multiparty connection, the exchange at the office Z reads the channel identification out of this message to check the state of the channel indicated by the channel identification. In this event, the exchange determines whether there are two or more call references corresponding to the above mentioned channel (Step S1). For the case illustrated in FIG. 10, there are two or more call references corresponding to the channel, so that step S1 becomes positive. This means that the terminal AT to be connected is a fourth or later participant to the conference (referred to the x-th party).

The exchange at the office Z determines whether the multiparty connection trunk 104 is acquired at the local office (Step S2). In the pattern in FIG. 10, the multiparty connection trunk is acquired at the office Z, so that the step S2 becomes positive. In this event, the exchange at the office Z sends to the exchange at the office Y the call setup message addressed to the terminal AT of the x-th party. When the terminal AT responds to the call, the exchange at the office Z connects the terminal AT to the ISDN trunk 102, and then connects the ISDN trunk 102 to the multiparty connection trunk 104 (Step S9). The above mentioned processing provides the multiparty connection among the four parties as illustrated in FIG. 10.

On the other hand, if the step S2 is negative indicating that no multiparty connection trunk 104 is acquired at the local office, the exchange at the office Z determines whether the multiparty connection trunk is available (Step S3). If there is no available multiparty connection trunk to be acquired, the exchange at the office Z sends the multiparty connection trunk acquisition request message to the upstream office (Step S4). On the contrary, if it is determined at the step S3 that there is an available multiparty connection trunk to be acquired, the exchange at the office Z acquires the multiparty connection trunk 104 (Step S5).

When the multiparty connection trunk 104 is acquired at the step S5, the exchange at the office Z connects the call among the terminals RT, ET, and TT to the multiparty connection trunk 104 (Step S8). Furthermore, the exchange at the office Z sends to the exchange at the office Y the call setup message addressed to the terminal AT of the x-th party. When the terminal AT responds to the call, the exchange at the office Z connects the terminal AT to the multiparty connection trunk (Step S9).

If the multiparty connection trunk 104 cannot acquired at the step S6, the multiparty connection acting request is sent to the upstream office (Step S7).

While the multiparty connection of the present invention has been described in conjunction with six typical patterns, there may be other pattern. For example, the office receiving the call setup message may be a trunk office or the multiparty connection acting request message may be received from a downstream office.

If the office receiving the call setup message is a trunk office, the exchange at that office activates the message relay processing unit 114 to replace the channel identification in the received call setup message by the channel identification of the channel used at the downstream from the trunk office. The call setup message only the channel identification of which is replaced is sent from the ISDN protocol control unit 120 to the downstream office.

Figure 21:
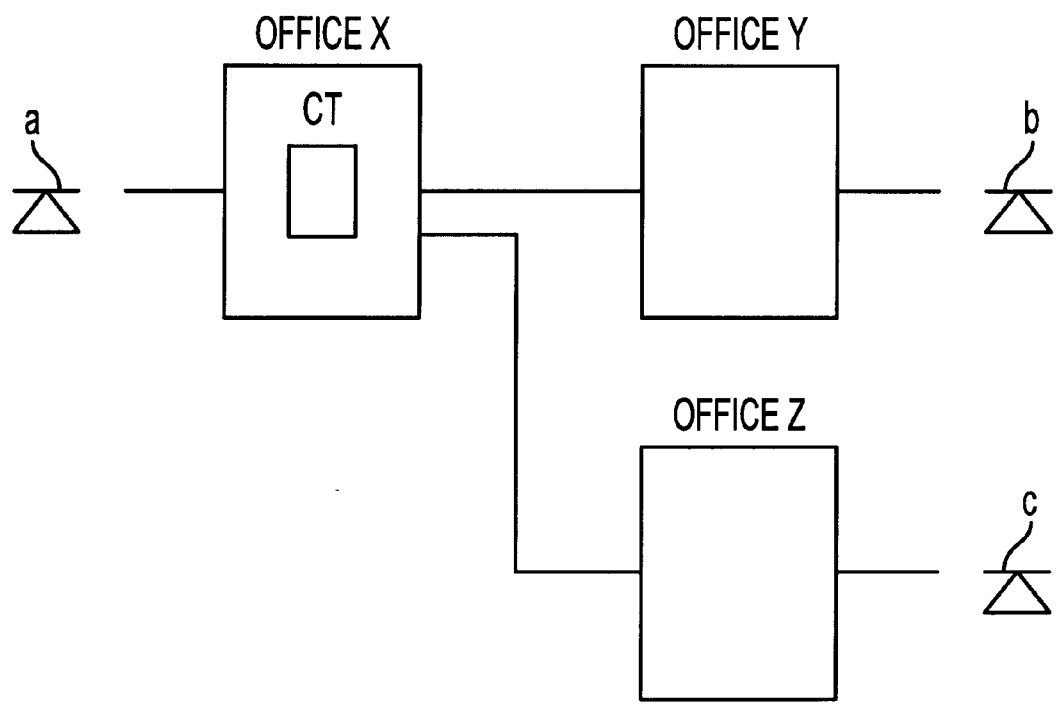
FIG. 21 is a view for use in describing a case where the x-th party has a different route from the x-1-th party in a multiparty connection requesting party terminal office.
Figure 22:
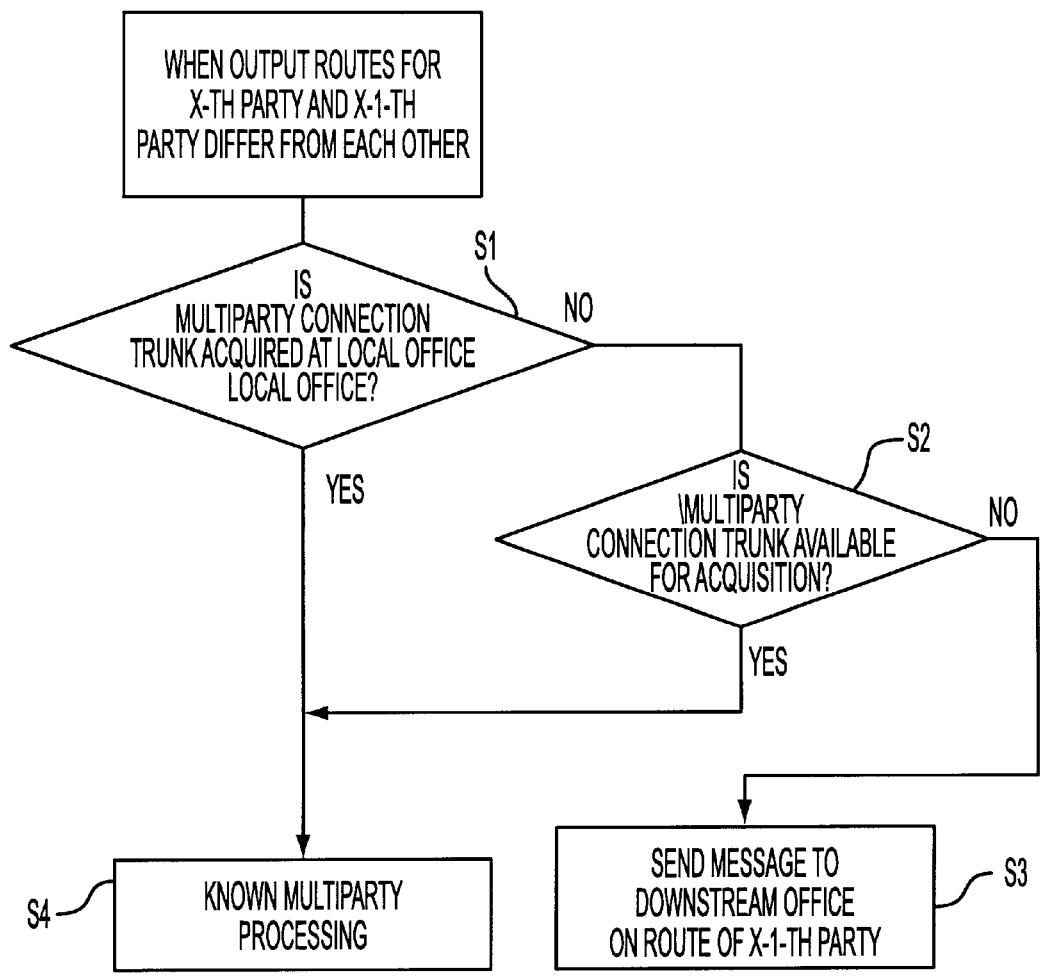
FIG. 22 is a flow chart illustrating a processing to be carried out in the case where the x-th party has a different route from the x-1-th party in a multiparty connection requesting party terminal office.

If an office receives the multiparty connection acting request message from the downstream office, the exchange at that office activates the multiparty connection acting processing unit 115 to acquire the multiparty connection trunk 104. The multiparty connection acting processing unit 115 connects the communicating call to the multiparty connection trunk 104 when it succeeds to acquire that trunk. In addition, the multiparty connection acting processing unit 115 calls the third party terminal TT and connects it to the multiparty connection trunk 104. If the multiparty connection acting processing unit 115 fails to acquire the multiparty connection trunk, the multiparty connection acting request message is sent to an upstream office if the office where the multiparty connection acting processing unit 115 is located is not the one having the terminal RT. There is another pattern in which the route from the office X where the requesting party terminal RT is located to the third party terminal TT is different from the route to the communicating party terminal ET as shown in FIG. 22. In such a case, the exchange at the office X acquires the multiparty connection trunk 104 for the multiparty connection. This pattern can also be applied to the case of the interoffice multiparty connection request to the third, fourth, or more parties in which the route for the x-th party (corresponding to the terminal TT in FIG. 21) is different from the route for the x-1-th party (corresponding to the terminal AT in FIG. 21) at the office where the requesting party terminal is located (corresponding to the office X in FIG. 21). In such a case, the exchange at the office where the requesting party terminal is located carries out the processing as shown in FIG. 22.

More specifically, when the route for the x-th party is different from the route for the x-1-th party, the exchange determines whether the multiparty connection trunk at the local office is used for the multiparty connection (i.e., whether the multiparty connection trunk at the local office is occupied) (Step S1).

If it is determined at the step S1 that the multiparty connection trunk at the local office is occupied the exchange carries out the known multiparty connection processing (Step S4). On the other hand, if it is determined at the step S1 that no multiparty connection trunk is acquired at the local office the exchange determines whether the multiparty connection trunk is available for the acquisition (Step S2). If step S2 is positive the exchange conducts the known multiparty connection processing (Step S4). On the other hand, if it is determined the multiparty connection trunk cannot be acquired, the exchange sends the multiparty connection trunk acquisition request message to a downstream office (office Y in FIG. 21) on the local route as the x-1-th party (Step S3). Though not illustrated, the multiparty connection trunk is then acquired at the downstream office to connect each call.

What is claimed is:

1. An interoffice multiparty connection method in a network, comprising the steps of:

generating, when a multiparty connection request is issued from a first terminal at a first office communicating with a second terminal at a second office to establish a multiparty connection with a third party at the second office or at another office on the local route as the second office, a call setup message for the multiparty connection by a first exchange at the first office, said call setup message including a channel number which specifies a channel occupied for the communication between the second terminal at the second office and the requesting party terminal, a new call reference which is different from an existing call reference used for the subject communication, and information for identifying a terminal of a third party;

sending said call setup message on the local route towards the second office by the first exchange;

determining, by a second exchange at an office on the route, whether the third party terminal is a terminal at the local office when said call setup message is received at said second office or at another office on said local route and when the channel specified by said channel number in the received call setup message is occupied and the call reference corresponding to the occupied channel is different from the call reference in the received call setup message; and acquiring, by the second exchange, if the third party terminal is a terminal located at the local office, a multiparty connection trunk to establish the multiparty connection between said multiparty connection trunk, the communication call which occupied said channel and the third party terminal.

2. An interoffice multiparty connection method as claimed in claim 1, wherein the second exchange at the office on the route acquires the multiparty connection trunk to connect the communication call occupying the channel specified by the channel number to the multiparty connection trunk when it is determined that the third party terminal is not the one located at the local office;

sends to a downstream office a call setup message addressed to the third party terminal; and connects the third party terminal to the multiparty connection trunk when the third party terminal responds.

3. An interoffice multiparty connection method as claimed in claim 1, wherein an exchange at a transit office loccated between the first office and the second office determines whether or not the third party terminal is located at the transit office;

acquires the multiparty connection trunk to connect the call thereto and calls the third party terminal when the third party terminal is located at the transit office; and connects the third party terminal to the multiparty connection trunk when the third party terminal responds.

4. An interoffice multiparty connection method as claimed in claim 1, wherein an exchange at a transit office located between the first office and the second office determines whether or not the third party terminal is located at the transit office;

acquires the multiparty connection trunk to connect the call thereto when the third party terminal is located at an office on the different route from the different office rather than at the local office;

sends to the route of the office where the third party terminal is located a call setup message addressed to the third party terminal; and connects the third party terminal to the multiparty connection trunk when the third party terminal responds.

5. An interoffice multiparty connection method as claimed in claim 1, wherein the exchange receiving the call setup message sends, when it fails to acquire the multiparty connection trunk, a message requesting the acting of the multiparty connection to an upstream office; and wherein the exchange at the upstream office acquires when it receives the message to connect the call and the call of the third party terminal to the multiparty connection trunk.

6. An interoffice multiparty connection method as claimed in claim 1, wherein the exchange receiving the call setup message determines whether or not the multiparty connection trunk is acquired at the local office when the channel specified by the channel number included in this message is occupied and when there are two or more call references are occupied that correspond to the occupied channel;

connects to the multiparty connection trunk the terminal to which the call setup message is addressed as the fourth or later terminal when the multiparty connection trunk is acquired at the local office; and acquires the multiparty connection trunk at the local or the different office and connects to the multiparty connection trunk the fourth or later terminal of the multiparty connection when the multiparty connection trunk is not acquired at the local office.

7. An interoffice multiparty connection method as claimed in claim 6, wherein the exchange receiving the call setup message sends the call setup message as such to a downstream office when no multiparty connection trunk is acquired in the local office.

8. An exchange comprising a request transmitting portion and a request receiving portion, said request transmitting portion comprising:

multiparty connection request analysis means for determining whether or not a third party terminal is located at an office on a local route as a different office when it receives a multiparty connection request signal including a phone number of the third party terminal from a first terminal communicating with a second terminal at the different office;

message generation means for generating a call setup message including a channel number which specifies a channel occupied for the communication call between the first terminal and the second terminal, a new call reference different from a call reference used for the communication between the first terminal and the second terminal, and information for identifying the third party terminal when it is determined that the third party terminal is located at an office on a local route as the second terminal; and message transmission means for transmitting the call setup message generated by said message generation means towards the route through a control channel, said request receiving portion comprising:

message analysis means for determining, when receiving a call setup message from an upstream office, that the received call setup message is the one for a multiparty connection request if a channel specified by a channel number in the received call setup message is occupied and a call reference corresponding to the occupied channel is different from a call reference in the received call setup message;

attribute determination means for determining whether or not a second terminal is located at the local office and whether or not a third party terminal is located at the local office; and multiparty connection means for acquiring a multiparty connection trunk at the local office when the second terminal and the third party terminal are both located at the local office to connect the first terminal, the second terminal, and the third party terminal to the multiparty connection trunk.

9. An exchange as claimed in claim 8, wherein said request transmitting portion further comprises acting request means for generating a multiparty connection acting request message for requesting the acting of the multiparty connection when said multiparty connection means fails to acquire a multiparty connection trunk and sending the generated message to an exchange at an upstream office.

10. An exchange as claimed in claim 9, wherein said request receiving portion further comprises multiparty connection acting processing means for use in acting a multiparty connection trunk in the local office to connect the communication call between the first terminal and the second terminal and for calling the third party terminal to connect the third party terminal to the multiparty connection trunk, when the multiparty connection acting request message is received from an exchange at a downstream office.

11. An exchange as claimed in claim 8, wherein said multiparty connection means acquires the multiparty connection trunk at the local office to connect the communication call between the first terminal and the second terminal to the multiparty connection trunk and sends to an exchange at a downstream office a call setup message addressed to the third party terminal when said attribute determination means determines that the second terminal is located at the local office and that the third party terminal is not located at the local office, and wherein said multiparty connection means connects the call of the third party terminal to the multiparty connection trunk when the third party terminal responds.

12. An exchange as claimed in claim 8, wherein said multiparty connection means acquires the multiparty connection trunk at the local office to connect the communication call between the first call and the second terminal to the multiparty connection trunk when said attribute determination means determines that the second terminal is not located at the local office and that the third party terminal is located at the local office and calls the third party terminal to connect the third party terminal to the multiparty connection trunk.

13. An exchange as claimed in claim 8 further comprising message relay processing means for sending the call setup message as such to a downstream office when said attribute determination means determines that the second terminal and the third party terminal are not located at the local office and that the rout of the office where the second terminal is located is same route of the office where the third party terminal is located.

14. An exchange at a first office comprising:

multiparty request receiving means for receiving a multiparty connection request for establishing a multiparty connection with a third party terminal located at a second office or at another office on the local route as the second office including a second terminal communicating with a first terminal at a first office;

generating means for generating a call setup message including a channel number which specifies a channel occupied for the communication between the first terminal and the second terminal, a new call reference that is different from an existing call reference used for the subject communication, and information for identifying a third party terminal; and sending means for sending the call setup message on the local route towards the second office.

15. An exchange comprising:

receiving means for receiving, a call setup message for multiparty connection between a first terminal at a first office, a second terminal at a second office, and a third party terminal from a first exchange at the first office which received a request for establishing the multiparty connection from the first terminal communicating with the second terminal, the call setup message including a channel number which specifies a channel occupied for the communication between the first terminal and the second terminal, a new call reference that is different from an existing call reference used for the subject communication, and information for identifying a third party terminal;

determining means for determining whether the third party terminal specified by the information in the received call setup message is a terminal at the local office, when said channel specified by the channel number in the received call setup message is occupied and the call reference corresponding to the occupied channel is different from the call reference in the received call setup message; and acquiring means for acquiring, when said determining means judges that the third party terminal is a terminal at the local office, a multiparty connection trunk to establish the multiparty connection between the call which occupied the channel and the third party terminal.

16. An exchange comprising:

receiving means for receiving, a call setup message for multiparty connection between a first terminal at a first office, a second terminal at a second office, and a third party terminal from a first exchange at the first office which received a request for establishing the multiparty connection from the first terminal communicating with the second terminal, the call setup message including a channel number which specifies a channel occupied for the communication between the first terminal and the second terminal, a new call reference that is different from an existing call reference used for the subject communication, and information for identifying the third party terminal;

determining means for determining whether the third party terminal specified by the information in the received call setup message is a terminal at the local office, when the channel specified by the channel number in the received call setup message is occupied and the call reference corresponding to the occupied channel is different from the call reference in the received call setup message; and relaying means for relaying, when said determining means judges that the third party terminal is not a terminal at the local office, the call setup message to a downstream office.

17. An exchange comprising:

receiving means for receiving, a call setup message for multiparty connection between a first terminal at a first office, a second terminal at a second office, and a third party terminal from a first exchange at the first office which received a request for establishing the multiparty connection from the first terminal communicating with the second terminal, the call setup message including a channel number which specifies a channel occupied for the communication between the first terminal and the second terminal, a new call reference that is different from an existing call reference used for the subject communication, and information for identifying the third party terminal;

determining means for determining, when the channel specified by the channel number in the received call setup message is occupied and the call reference corresponding to the occupied channel is different from the call reference in the received call setup message, whether the call which occupied the channel has been relayed; and acquiring means for acquiring, when said determined means judged that the exchange relays the call occupied the channel, a multiparty connection trunk to establish the multiparty connection between the call occupied the channel and the third party terminal.

18. An exchange as claimed in claim 17, wherein said attribute determination means determines whether or not a route of an office where the second terminal is located is different from a route of an office where the third party terminal is located, when it is determined that the second terminal and the third party terminal are not located at the local office;

said multiparty connection means acquires the multiparty connection trunk in the local office when the route of the office where the second terminal is located is different from the route of the office where the third party terminal is located, and the call setup message addressed to the second terminal is sent to the route of the office where the second terminal is located, and the call setup message addressed to the third party terminal is sent to the route of the office where the third party terminal is located; and wherein the call of the first terminal, the call of the second terminal, and the call of the third party terminal are connected to the multiparty connection terminal when the second terminal and the third party terminal respond.

19. An exchange comprising:

receiving means for receiving, a call setup message for multiparty connection between a first terminal at a first office, a second terminal at a second office, and a third party terminal from a first exchange at the first office which received a request for establishing the multiparty connection from the first terminal communicating with the second terminal, said call setup message including a channel number which specifies a channel occupied for the communication between the first terminal and the second terminal, a new call reference that is different from an existing call reference used for the subject communication, and information for identifying the third party terminal;

relay determining means for determining, when the channel specified by the channel number in the received call setup message is occupied and the call reference corresponding to the occupied channel is different from the call reference in the received call setup message, whether the call which occupied the channel has been relayed;

route determining means for determining, when said relay determining means judges that the exchange relays the call which occupied the channel and the third party terminal is not a terminal at the local office, whether a route of the second office where the second terminal is located is different from a route of an office where the third party terminal is located;

sending means for sending, when said route determining means judges that the route of the second office where the second terminal is located is different from a route of the office where the third party terminal is located, a call setup message addressed to the third party terminal to a downstream office; and acquiring means for acquiring a multiparty connection trunk in the local office and connecting the call which occupied the channel which is specified by the channel number in the received call setup message and a call of the third party terminal to the multiparty connection trunk, if the third party terminal responds to the call setup message sent by said sending means.

* * * * *